United States Patent
Zinski et al.

(10) Patent No.: US 10,913,195 B2
(45) Date of Patent: Feb. 9, 2021

(54) PLURAL AIR FLOW REGULATOR DELIVERY APPARATUS AND METHOD

(71) Applicants: Novatec, Inc., Baltimore, MD (US); Stephen B. Maguire, West Chester, PA (US)

(72) Inventors: James Zinski, Ellicot City, MD (US); Stephen B. Maguire, West Chester, PA (US)

(73) Assignee: Novatec, Inc., Baltimore, MD (US)

( * ) Notice: Subject to any disclaimer, the term of this patent is extended or adjusted under 35 U.S.C. 154(b) by 0 days.

(21) Appl. No.: 16/288,418

(22) Filed: Feb. 28, 2019

(65) Prior Publication Data

US 2019/0193321 A1   Jun. 27, 2019

Related U.S. Application Data

(60) Division of application No. 15/837,078, filed on Dec. 11, 2017, which is a division of application No. 15/066,157, filed on Mar. 10, 2016, now Pat. No. 9,937,651, and a continuation-in-part of application No. 14/804,404, filed on Jul. 21, 2015, now abandoned, and a continuation-in-part of application No. 14/602,784, filed on Jan. 22, 2015, now Pat. No. 9,550,636, and a continuation-in-part of application No. 14/593,010, filed on Jan. 9, 2015, now Pat. No. 9,550,635, and a continuation-in-part of application No. 14/574,561, filed on Dec. 18, 2014, now Pat. No. 9,604,793, and a continuation-in-part of application (Continued)

(51) Int. Cl.
*B65G 53/66* (2006.01)
*B29C 48/285* (2019.01)
*B29K 105/00* (2006.01)

(52) U.S. Cl.
CPC ............ *B29C 48/288* (2019.02); *B65G 53/66* (2013.01); *B29K 2105/251* (2013.01)

(58) Field of Classification Search
CPC . B65G 53/24; B65G 53/66; B65G 2812/1625
USPC .................................. 406/117, 120, 151, 156
See application file for complete search history.

(56) References Cited

U.S. PATENT DOCUMENTS

| | | |
|---|---|---|
| 1,001,510 A | 8/1911 | Curbey |
| 1,418,096 A | 5/1922 | Royer |

(Continued)

FOREIGN PATENT DOCUMENTS

| | | |
|---|---|---|
| CN | 202302166 U | 7/2012 |
| DE | 3541532 A1 | 5/1986 |

(Continued)

OTHER PUBLICATIONS

Sheet of 2 photographs of Mould-Tek gravimetric blender, circa 1993.

(Continued)

*Primary Examiner* — Joseph A Dillon, Jr.
(74) *Attorney, Agent, or Firm* — Fox Rothschild LLP

(57) ABSTRACT

A vacuum pump with a first flow regulator connected to the suction head of the vacuum pump for conveying granular resin material from a supply to receivers retaining and dispensing the resin when needed by a process machine and a second flow regulator controlling and limiting to a maximum value vacuum flow through a conduit carrying auxiliary additives to the receivers.

11 Claims, 12 Drawing Sheets

Related U.S. Application Data

No. 14/185,016, filed on Feb. 20, 2014, now Pat. No. 9,371,198.

(56) References Cited

U.S. PATENT DOCUMENTS

| | | | |
|---|---|---|---|
| 1,579,251 | A | 4/1926 | Schossow |
| 2,116,912 | A | 5/1938 | Richardson |
| 2,161,190 | A | 6/1939 | Paull |
| 2,351,035 | A | 6/1944 | Grant, Jr. |
| 2,403,689 | A | 7/1946 | Sprague |
| 2,601,654 | A | 6/1952 | Wright |
| 2,655,934 | A | 10/1953 | Charles |
| 2,718,435 | A | 9/1955 | Hudspeth |
| 2,765,812 | A | 10/1956 | Werner |
| 2,917,077 | A | 12/1959 | Ziege |
| 3,077,365 | A * | 2/1963 | Fisher .................. A21C 1/143 406/23 |
| 3,111,115 | A | 11/1963 | Best |
| 3,115,276 | A | 12/1963 | Johanningmeier |
| 3,122,162 | A | 2/1964 | Sands |
| 3,151,628 | A | 10/1964 | Heckert |
| 3,164,141 | A | 1/1965 | Jones |
| 3,209,898 | A | 10/1965 | Beebe et al. |
| 3,239,278 | A | 3/1966 | Mueller |
| 3,348,848 | A | 10/1967 | Lucking et al. |
| 3,367,362 | A | 2/1968 | Hoffman |
| 3,378,310 | A * | 4/1968 | Christensen .......... B65G 53/00 406/14 |
| 3,381,708 | A | 5/1968 | Chenoweth |
| 3,434,493 | A | 3/1969 | Owens |
| 3,468,338 | A | 9/1969 | Patterson Arch |
| 3,470,994 | A | 10/1969 | Schnell et al. |
| 3,621,873 | A | 11/1971 | Kenann |
| 3,667,087 | A | 6/1972 | Dakin |
| 3,735,777 | A | 5/1973 | Katzer et al. |
| 3,773,065 | A | 11/1973 | Mattox |
| 3,773,300 | A | 11/1973 | Hauser |
| 3,794,077 | A | 2/1974 | Fanshier |
| 3,854,778 | A | 12/1974 | Trythall |
| 3,861,830 | A | 1/1975 | Johnson |
| 3,872,884 | A | 3/1975 | Busdiecker |
| 3,931,953 | A | 1/1976 | Allen |
| 3,951,461 | A | 4/1976 | De Feudis |
| 3,959,636 | A | 5/1976 | Johnson et al. |
| 3,985,262 | A | 10/1976 | Nauta |
| 4,005,908 | A | 2/1977 | Freeman |
| 4,026,442 | A | 5/1977 | Orton |
| 4,108,334 | A | 8/1978 | Moller |
| 4,148,100 | A | 4/1979 | Moller |
| 4,174,731 | A | 11/1979 | Sturgis |
| 4,183,467 | A | 1/1980 | Sheraton |
| 4,219,136 | A | 8/1980 | Williams et al. |
| 4,221,510 | A | 9/1980 | Smith |
| 4,262,878 | A | 4/1981 | O'ffill |
| 4,269,223 | A | 5/1981 | Carter et al. |
| 4,284,261 | A | 8/1981 | Benjamin |
| 4,294,020 | A | 10/1981 | Evans |
| 4,342,443 | A | 8/1982 | Wakeman |
| 4,354,622 | A | 10/1982 | Wood |
| 4,373,838 | A | 2/1983 | Foreman |
| 4,402,436 | A | 9/1983 | Hellgren |
| 4,402,635 | A | 9/1983 | Maruo |
| 4,454,943 | A | 6/1984 | Moller |
| 4,475,672 | A | 10/1984 | Whitehead |
| 4,498,783 | A | 2/1985 | Rudolph |
| 4,501,518 | A | 2/1985 | Smith |
| 4,508,091 | A | 4/1985 | Wakeman |
| 4,511,291 | A | 4/1985 | Quates, Sr. |
| 4,525,071 | A | 6/1985 | Horowitz et al. |
| 4,581,704 | A | 4/1986 | Mitsukawa |
| 4,586,854 | A | 5/1986 | Newman |
| 4,705,083 | A | 11/1987 | Rossetti |
| 4,756,348 | A | 7/1988 | Moller |
| 4,793,711 | A | 12/1988 | Ohlson |
| 4,798,516 | A | 1/1989 | Jagst |
| 4,812,086 | A | 3/1989 | Kopernicky |
| 4,830,508 | A | 5/1989 | Higuchi et al. |
| 4,834,385 | A | 5/1989 | Jackson |
| 4,842,198 | A | 6/1989 | Chang |
| 4,848,534 | A | 7/1989 | Sandwall |
| 4,850,703 | A | 7/1989 | Hanaoka et al. |
| 4,962,831 | A | 10/1990 | Dundas |
| 4,973,202 | A * | 11/1990 | Becker .................. B65G 53/24 15/301 |
| 4,995,422 | A | 2/1991 | Chew |
| 5,011,043 | A | 4/1991 | Whigham |
| 5,054,965 | A | 10/1991 | Clark |
| 5,110,521 | A | 5/1992 | Moller |
| 5,116,547 | A | 5/1992 | Tsukahara et al. |
| 5,132,897 | A | 7/1992 | Allenberg |
| 5,143,166 | A | 9/1992 | Hough |
| 5,147,152 | A | 9/1992 | Link |
| 5,148,943 | A | 9/1992 | Moller |
| 5,172,489 | A | 12/1992 | Moller |
| 5,225,210 | A | 7/1993 | Shimoda |
| 5,232,314 | A | 8/1993 | Hopkins |
| 5,244,179 | A | 9/1993 | Wilson |
| 5,252,008 | A | 10/1993 | May, III et al. |
| 5,261,743 | A | 11/1993 | Moller |
| 5,285,930 | A | 2/1994 | Nielsen |
| 5,340,949 | A | 8/1994 | Fujimura et al. |
| 5,341,961 | A | 8/1994 | Hausam |
| 5,378,089 | A | 1/1995 | Law |
| 5,415,321 | A | 5/1995 | Gehlert |
| 5,423,455 | A | 6/1995 | Ricciardi et al. |
| 5,575,309 | A | 11/1996 | Connell |
| 5,575,596 | A | 11/1996 | Bauer |
| 5,613,516 | A | 3/1997 | Landrum |
| 5,622,457 | A * | 4/1997 | Thiele .................. B65G 53/56 406/1 |
| 5,651,401 | A | 7/1997 | Cados |
| 5,669,265 | A | 9/1997 | Adler |
| 5,704,391 | A | 1/1998 | McGowan et al. |
| 5,767,453 | A | 6/1998 | Wakou et al. |
| 5,767,455 | A | 6/1998 | Mosher |
| 5,780,779 | A | 7/1998 | Kitamura et al. |
| 5,791,830 | A | 8/1998 | Fort |
| 5,794,789 | A | 8/1998 | Payson |
| 5,843,513 | A | 12/1998 | Wilke et al. |
| 6,007,236 | A | 12/1999 | Maguire |
| 6,036,407 | A | 3/2000 | Nester |
| 6,070,610 | A | 6/2000 | Owler |
| 6,076,803 | A | 6/2000 | Johnson |
| 6,085,777 | A | 7/2000 | Welker |
| 6,089,794 | A | 7/2000 | Maguire |
| 6,102,629 | A | 8/2000 | Ishida |
| 6,152,656 | A | 11/2000 | Curtis et al. |
| 6,158,363 | A | 12/2000 | Memory et al. |
| 6,199,583 | B1 | 3/2001 | Iacovella |
| 6,227,768 | B1 | 5/2001 | Higuchi et al. |
| 6,379,086 | B1 | 4/2002 | Goth |
| 6,386,800 | B1 | 5/2002 | van Eyck |
| 6,413,020 | B1 | 7/2002 | Davison |
| 6,419,418 | B1 | 7/2002 | Smith |
| 6,447,215 | B1 | 9/2002 | Wellmar |
| 6,497,083 | B1 | 12/2002 | Garwood |
| 6,585,004 | B1 | 7/2003 | Porter |
| 6,588,988 | B2 | 7/2003 | Zlotos |
| 6,634,375 | B2 | 10/2003 | Olivas |
| 6,644,345 | B2 | 11/2003 | Dulin |
| 6,648,558 | B1 | 11/2003 | Shultz |
| 6,786,681 | B2 | 9/2004 | Grasshoff |
| 6,834,755 | B2 | 12/2004 | Jay |
| 6,871,618 | B2 | 3/2005 | Masse |
| 6,890,129 | B2 | 5/2005 | Fabbri |
| 6,923,601 | B2 | 8/2005 | Goth |
| 6,942,133 | B2 | 9/2005 | Frankeberger |
| 6,981,619 | B2 | 1/2006 | Moretto |
| 7,066,689 | B2 | 6/2006 | Maguire |
| 7,080,960 | B2 | 7/2006 | Burnett |
| 7,114,889 | B2 | 10/2006 | Kanou |
| 7,117,886 | B2 | 10/2006 | Kajitani |
| 7,137,729 | B2 | 11/2006 | Moretto |
| 7,188,434 | B2 | 3/2007 | Moretto |

(56) References Cited

U.S. PATENT DOCUMENTS

| | | |
|---|---|---|
| 7,191,807 B2 | 3/2007 | DeMaison |
| 7,192,222 B2 | 3/2007 | Van Mullekom |
| 7,231,927 B2 | 6/2007 | Suehara |
| 7,311,474 B1 | 12/2007 | Ogasahara |
| 7,318,459 B2 | 1/2008 | Frankeberger |
| 7,384,018 B2 | 6/2008 | Moretto |
| 7,472,494 B2 | 1/2009 | Moretto |
| 7,503,128 B2 | 3/2009 | Moretto |
| 7,662,211 B2 | 2/2010 | Federico |
| 7,766,037 B2 | 8/2010 | Moenkhaus |
| 7,766,305 B2 | 8/2010 | Kim |
| 8,021,462 B2 | 9/2011 | Moretto |
| D650,888 S | 12/2011 | Moretto |
| 8,070,844 B2 | 12/2011 | Maguire |
| 8,092,070 B2 | 1/2012 | Maguire |
| 8,113,745 B2 | 2/2012 | Aoki |
| D671,563 S | 11/2012 | Moretto |
| D671,564 S | 11/2012 | Moretto |
| 8,322,951 B2 | 12/2012 | Kvalheim |
| 8,360,691 B2 | 1/2013 | Moretto |
| 8,408,228 B1 | 4/2013 | Jimenez |
| 8,412,383 B2 | 4/2013 | Moretto |
| D688,711 S | 8/2013 | Moretto |
| 8,672,194 B2 | 3/2014 | Moretto |
| 8,753,432 B2 | 6/2014 | Maguire |
| 8,763,273 B2 | 7/2014 | Moretto |
| 8,793,900 B2 | 8/2014 | Moretto |
| 8,794,259 B2 | 8/2014 | Daneshgari |
| D718,791 S | 12/2014 | Moretto |
| 8,905,681 B2 | 12/2014 | Schneider |
| 8,914,990 B2 | 12/2014 | Moretto |
| 9,181,044 B1 | 11/2015 | Baker |
| 9,365,367 B2 | 6/2016 | Kraemer |
| 9,371,198 B2 | 6/2016 | Maguire |
| 9,459,183 B1 | 10/2016 | Schnakenberg |
| 9,550,635 B2 | 1/2017 | Maguire |
| 9,550,636 B2 | 1/2017 | Maguire |
| 9,561,915 B2 | 2/2017 | Kelly |
| 9,604,793 B2 | 3/2017 | Maguire |
| 9,637,320 B2 | 5/2017 | Moretto |
| 9,663,263 B2 | 5/2017 | Moretto |
| 9,731,914 B2 | 8/2017 | Rasner |
| 2002/0061232 A1 | 5/2002 | Zlotos |
| 2002/0136609 A1 | 9/2002 | Maguire |
| 2003/0168618 A1 | 9/2003 | Coney |
| 2004/0115013 A1 | 6/2004 | Goth |
| 2004/0221893 A1 | 11/2004 | Johnson |
| 2005/0012058 A1 | 1/2005 | Medina |
| 2005/0039816 A1 | 2/2005 | Maguire |
| 2005/0089378 A1 | 4/2005 | Gerber |
| 2005/0265793 A1 | 12/2005 | Van Mullekom |
| 2008/0314461 A1 | 12/2008 | Moretto |
| 2009/0031580 A1 | 2/2009 | Moretto |
| 2009/0039106 A1 | 2/2009 | Moretto |
| 2009/0090018 A1 | 4/2009 | Moretto |
| 2009/0151800 A1 | 6/2009 | Salmento |
| 2009/0295016 A1 | 12/2009 | Shinohara |
| 2011/0097159 A1 | 4/2011 | Haberl |
| 2011/0211919 A1 | 9/2011 | Rasner |
| 2011/0299943 A1 | 12/2011 | Woolever |
| 2012/0201917 A1 | 8/2012 | Shinohara |
| 2012/0230779 A1 | 9/2012 | Dunstan |
| 2013/0202370 A1 | 8/2013 | Moretto |
| 2013/0209180 A1 | 8/2013 | Moretto |
| 2015/0175282 A1 | 6/2015 | Thompson |
| 2015/0232287 A1 | 8/2015 | Maguire |
| 2015/0232289 A1 | 8/2015 | Maguire |
| 2015/0232290 A1 | 8/2015 | Maguire |
| 2015/0308584 A1 | 10/2015 | Ehrne |
| 2015/0321860 A1 | 11/2015 | Maguire |
| 2016/0039553 A1 | 2/2016 | Akdogan |
| 2016/0096693 A1 | 4/2016 | Hanaoka |
| 2016/0106027 A1 | 4/2016 | Wilhelmi |
| 2016/0158967 A1 | 6/2016 | Maguire |
| 2016/0167897 A1 | 6/2016 | Wiemers |
| 2016/0244275 A1 | 8/2016 | Maguire |
| 2016/0272439 A1 | 9/2016 | Kelly |
| 2016/0280473 A1 | 9/2016 | Veselov |
| 2016/0292953 A1 | 10/2016 | Brown |
| 2016/0347557 A1 | 12/2016 | Tell |
| 2017/0174447 A1 | 6/2017 | Baker |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

Sheet of 2 photographs of Motan gravimetric blender and feeding system with Maguire Products, Inc. controls, circa 1993.

Sheet of 3 photographs of UNA-DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line-up of Blender Solutions . . . Priced Right" by HydReclaim, circla 1993.

Advertisement entitled "New From HydReclaim—Now Processors Can Economically Achieve Continuous Gravimetric Blending" by HydReclaim, circa 1993.

Article entitled "Control Loading Systems" from Plastics Technology, Oct. 1995, p. 41.

Advertisement "Introducing our 400 VME-II Gravimetric Blender" by HydReclaim Corporation, circa 1993.

Four p. brochure entitled "Gravimix Better Quality through Research", circa 1993.

Four p. brochure entitled "Conomix Plus Volumetric Blender" dated Aug. 1993.

Four page brochure entitled "Conair Franklin Autocolor Y Mezclador" dated Mar. 1995.

Two-sided flyer entitled "GB 140 Series Compact Auto Weigh Blender" published by Conair Franklin in the United States, Jun. 1994.

Six page brochure entitled "Graviblend Precise Continuous Weigh Blenders" published by Ktron Vertech, Jun. 1991, United States.

Six page brochure entitled "Piovan Gravimetric Blenders MDW" published by Piovan Sri, Oct. 1993, Venezia, Italy.

One page two-sided flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thirty-two page catalog entitled "Maguire Color Blending Equipment" published by Maguire Products, Inc., 1993, United States.

Two page brochure entitled "Mould-Tek Bulk Handling Systems" published by Mould-Tek Industries, Inc. in Canada, circa 1993.

Brochure entitled "Plastic Molders and Extruders: published by Maguire Products, Inc., 1995".

Five page brochure entitled "Blending power: GXB Blender the Better Alternative" of Mould-Tek, circa 1998.

(56) References Cited

OTHER PUBLICATIONS

Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.*.
Four page two-sided color brochure entitled "Novatec Inc. Vacuum Loaders—Electro-Polished Stainless Steel Finish" of Novatec Inc., undated*.
Eight page two-sided color brochure entitled "Novatec Inc. Material Conveying Solutions for the Plastics Industry", 1999*.
Two page two-sided color brochure entitled Maguire Model MPM Pre-Mixers of Maguire Products, Inc., Apr. 1997*.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries as Primary", AEC, Inc., 1999.
AEC Whitlock Operation and Installation Manual for VacTrac™ Series Conveying Systems, Single-Station Controllers, Oct. 30, 1997.
Whitlock Turbo-Vac™ Vacuum Power Units Installation,k Operation and Maintenance Manual, 1984.
AEC Whitlock Operation & Installation Manual—Continuous Vacuum/Pressure Conveying Systems, Single- and Dual-Blower Systems, Apr. 28, 1998.
AEC Whitlock Operation and Installation Manual WD Series WD350 to WD3000 Dehumidifying Dryers with Fuzzy Logic Controls, Oct. 11, 1995.
AEC Whitlock Operation and Installation Manual Nomad Series PD-2 to PD-4 Drying and Conveying Systems, Apr. 11, 1997.
AEC Whitlock HE-CHE-BCHE Mass Flow Series Dying Hoppers, Dec. 17, 1997.
Written Opinion for PCT Application No. PCT/US2016/12411, dated Mar. 2, 2016.
International Search Report for PCT Application No. PCT/US2016/12411, dated Mar. 2, 2016.
Written Opinion for PCT Application No. PCT/US2016/19455, dated May 13, 2016.
International Search Report for PCT Application No. PCT/US2016/19455, dated May 13, 2016.
Introduction to Pneumatic Conveying of Solids, Karl Jacob, The Dow Chemical Company, originally delivered on Sep. 8, 2010.

* cited by examiner

PLURAL AIR FLOW REGULATOR DELIVERY APPARATUS AND METHOD

CROSS REFERENCE TO RELATED PATENT APPLICATIONS

This patent application is a 35 USC 121 division of U.S. patent application Ser. No. 15/837,078, entitled "Plural Air Flow Limiter Delivery Apparatus and Method", filed 12 Nov. 2017 in the names of James Zinski and Stephen B. Maguire, published 12 Apr. 2018 as US 2018/0099448-A1. This application claims the priority of the '078 application under 35 USC 120.

The '078 application was a division of U.S. patent application Ser. No. 15/066,157, entitled "Resin Delivery Apparatus and Method with Plural Air Flow Limiters", filed 10 Mar. 2016 in the names of James Zinski and Stephen B. Maguire, published 30 Jun. 2016 as US 2016/0185538-A1, issued 10 Apr. 2018 as U.S. Pat. No. 9,937,651. This application claims the priority of the '157 application, through the '078 application, under 35 USC 120.

The '078 application was also a continuation in part of co-pending U.S. patent application Ser. No. 14/804,404, entitled "Vacuum Powered Resin Loading System Without Central Control", filed 21 Jul. 2015 in the name of Stephen B. Maguire, published 12 Nov. 2015 as US 2015/0321860-A1. This application claims the priority of the '404 application under 35 USC 120.

The '078 application was also a continuation-in-part of U.S. patent application Ser. No. 14/602,784, entitled "Method and Apparatus for Resin Delivery with Adjustable air Flow Limiter", filed 22 Jan. 2015 in the name of Stephen B. Maguire, published 20 Aug. 2015 as US 2015/0232290-A1, issued 24 Jan. 2017 as U.S. Pat. No. 9,550,636. This application claims the priority of the '784 application, through the '078 and '157 applications, under 35 USC 120.

The '078 application was also a continuation-in-part of U.S. patent application Ser. No. 14/593,010, entitled "Air Flow Limiter with Closed/Open Sensing", filed 9 Jan. 2015 in the name of Stephen B. Maguire, published 20 Aug. 2015 as US 2015/0232289-A1, issued 24 Jan. 2017 as U.S. Pat. No. 9,550,635. This application claims the priority of the '010 application, through the '078 and '157 applications, under 35 USC 120.

The '078 application is also a continuation-in-part of U.S. patent application Ser. No. 14/574,561, entitled "Resin Delivery System with Air Flow Limiter", filed 18 Dec. 2014 in the name of Stephen B. Maguire, published 20 Aug. 2015 as US 2015/0231801, issued 28 Mar. 2017 as U.S. Pat. No. 9,604,793. This application claims the priority of the '561 application, through the '078 and '157 applications, under 35 USC 120.

The '078 application is also a continuation-in-part of U.S. patent application Ser. No. 14/185,016, entitled "Air Flow Regulator", filed 20 Feb. 2014 in the name of Stephen B. Maguire, published 20 Aug. 2015 as US 2015/0232287-A1, issued 21 Jun. 2016 as U.S. Pat. No. 9,371,198. This application claims the priority of the '078 application, through the '078 and '157 applications, under 35 USC 120.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

BACKGROUND OF THE INVENTION

This invention relates to manufacture of plastic articles and more particularly relates to pneumatic conveyance and processing of plastic resin pellets prior to molding or extrusion of those pellets into a finished or semi-finished plastic product.

In this patent application, injection and compression molding presses and extruders are collectively referred to as "process machines."

THE TECHNOLOGY

The plastics industry is very diversified; there are thousands of different products, hundreds of materials, and dozens of processes, and all are very different from one another. The only thing all these differences share in common is that the source material is some type of plastic.

Equipment sold to this industry is, therefore, very diverse in design. Plastics factories have multiple process machines, sometimes several hundred in one location. Virtually all plastics fabricating operations require that each process machine, namely a molding press or an extruder, be supplied automatically with the required raw resin material on a continuous basis. This resin may be supplied in large boxes, called Gaylords, in fiber drums, in 50 pound bags, or more typically may be delivered by bulk truck or rail car, with the resin material then being transferred in bulk into storage silos. In all cases the resin material must be further distributed throughout the plant to each and every process machine. For that reason a great deal of design and capital expense is devoted to the automatic distribution of the raw resin material throughout the plant.

These resin distribution systems, more commonly referred to as "Loading Systems", must deal with many variables. One set of variables includes the type, shape, size and consistency of the granular material.

Resin pellets, nominally about ⅛ inch in size, come in various shapes, with round, square, and cylindrical being the most common.

Flowing resin powder is also an option, and very fine but free flowing resin pellets and other granular materials may be conveyed as well, The design variables to be considered for each customer include:
1. Type of resin being conveyed.
2. Size and consistency of the resin pellets.
3. Distances the resin pellets are to be conveyed.
4. Variability of these distances from shortest to longest.
5. Acceptable range for velocity of resin material travel through the lines.
6. Throughput rate of resin required for each machine.
7. Total throughput rate of resin for the entire plant.
8. Excess capacity performance margin so a molding or extrusion process is not interrupted by short term loading issues.
9. Loss of resin material from or at the supply so that only air is being pulled, thereby reducing system vacuum levels and reducing overall design throughput.
10. Loading sequence, or priority, when multiple receiver stations call for material.
11. Detecting problems and alarm conditions.
12. Proper air to material ratio for resin conveying.
13. Detecting plugged lines due to poor resin flow or over feeding of resin material.
14. Dust condition and filter requirements.
15. Reliability.

16. Serviceability.
17. Ease of use.
18. Cost
19. Vacuum pump type, namely positive displacement, regenerative, and others.
20. Vacuum pump horsepower and rated CFM capacity as well as vacuum levels.

In all of these areas, system designers look to find improved methods and solutions whenever possible.

One of the most important considerations is to hold a correct velocity for the conveyed resin material. The type of resin material dictates the target conveying speed. To maximize the resin material transfer rate, a high conveying speed is preferred, and air speed in any case must be sufficient to keep the resin pellets suspended and moving in the air stream. But velocity must be limited so as not to damage the pellets. Hard brittle pellets can fracture and break when conveyed, resulting in excessive dust.

Softer pellets can skid along the conduit walls, causing "angel hair" as a result of the plastic resin melting at the point of high speed contact with the conduit wall; this leaves a thin film on the wall. Strings of very thin "angel hair" accumulate, effectively reducing diameter of the conduit and causing problems in the system.

Air speed and resin conveying velocity are directly related to pump capacity (rated Cubic Feet per Minute, abbreviated as "CFM") and horsepower, as well as conveying line diameter. There is always a correct velocity "range" for each type of resin material. It is a design challenge to assure that resin material is conveyed within the correct velocity range.

Conveying distances affect system design. Conveying over short distances requires a less powerful vacuum source then over longer distances. Systems are generally sized to produce the best compromise for material velocity between the shortest and longest conveying distance.

Required conveying rate usually dictates line size (tube diameter), and this in turn dictates the CFM required to maintain correct velocity in a given diameter conduit. This means different tube sizes in the same system can be a problem if one vacuum pump is to draw air and resin through several different diameter conveying lines. Pumps have known CFM ratings. Pulling air through a small tube will result in higher velocity flow than pulling the same CFM through a larger tube.

Excessive velocity can damage pellets.

The type of vacuum pump to be selected is important. Regenerative blowers deliver wide ranging CFM depending on vacuum level. Positive displacement type pumps deliver high vacuum levels, and have a flatter CFM curve over their vacuum range. Regenerative blowers are quieter and generally cost less. Positive displacement blowers may require sound enclosures and tend to cost more, but are generally more reliable and more forgiving as respecting dust in the air.

The simplest systems use a fixed speed motor to drive the vacuum pump, and a single size conveying line to serve all receivers regardless of distance, rate requirement, or material.

VFD (Variable Frequency Drive) motors allow vacuum pumps to operate at different speeds, and therefore at different CFM rates, with the vacuum pump pulling different vacuum levels depending on preset information about each receiver being served, and/or making adjustments based on real time feedback of vacuum sensors located at various places in the system.

The addition of a SCFM (Standard Cubic Feet per Minute) regulator in the air flow line allows oversized vacuum pumps to be used without risk of conveying at excessive velocity. SCFM regulators restrict air flow to a preset SCFM. This maintains the desired SCFM air flow at the inlet, which is critical for proper conveying for a given size conveying line. This concept is the subject of U.S. Pat. No. 9,371,198.

Reading vacuum levels at various points tells the controlling processor if the line is open, which means only air and no material is present and air is flowing unrestrictedly. This signals a loss of material at the source. A high vacuum reading indicates a plugged or nearly plugged line. Normal conditions are present where material is flowing correctly at detected mid-vacuum levels.

One line size for all receivers assures the resin transport velocity is more likely to be in the acceptable range. However, most processes require the base resin material be delivered at 50 times the rate of additives, such as color concentrate. Virgin (or natural) pellets may have to be loaded at a rate of 1000 pounds per hour, requiring a 2.5 or 3 inch line size, while color is only required to be delivered at a rate of 20 to 40 pounds an hour. A smaller receiver is used for color, namely a receiver one that loads perhaps 5 pounds at a time, while the receiver for the virgin resin material will be larger, perhaps loading 50 pounds of each load cycle. A 2.5 inch line on a 5 pound receiver would be too large. 1.5 inch line would be standard, and the use of 1.5 inch resin conveying line would be better. But this risks velocities that are excessive. This results in trade-offs in design.

By placing a flow regulator at the pump suction intake, one can limit the maximum SCFM air flow to the design limit of the air flow regulator.

DESCRIPTION OF THE PRIOR ART

Current resin central loading systems concerned with conveying granular plastic resin pellets from a storage area for molding or extrusion typically include a vacuum pump or pumps and multiple receivers.

In some systems, with many receivers, several small pumps are used.

It would be less expensive to use only one, or fewer, larger pumps. However, a larger pump may draw too much air with resulting damage to the material being conveyed. While a larger pump could load several receivers at once, there is a risk that an "open" line, namely a line pulling only air, and no resin material, would cause the vacuum to drop too much, and no resin would load. Also, when only one receiver is loading resin, air velocity might be too high, again with a risk of damaging the resin.

Nevertheless, in facilities that fabricate plastic products by molding or extrusion, it is common to use such vacuum loading systems to pneumatically convey pellets of thermoplastic resin, prior to molding or extrusion of those pellets into a finished or semi-finished product. The plastic resin pellets are typically purchased in 50 pound bags, 200 pound drums, or 1,000 pound containers commonly referred to as "Gaylords."

A common approach for conveying plastic resin pellets from a storage location to a process machine, which approach is often used in larger facilities, is to install a central vacuum pump or even several vacuum pumps, connected by common vacuum lines to multiple "receivers."

Vacuum pumps connected to the vacuum lines draw vacuum, namely air at pressure slightly below atmospheric, as the vacuum pump sucks air through the "vacuum" line.

The suction moves large quantities of air which carries thermoplastic resin pellets through the "vacuum" line.

An alternative is to use positive pressure produced by a blower or the exhaust side of a vacuum pump. With such an approach, the positive pressure results in a movement of substantial amounts of air which may be used to carry the plastic resin pellets. However, the vacuum approach of drawing or sucking or pulling pellets through the system conduit(s) is preferable to the positive pressure approach of pushing the resin pellets through the system conduit(s).

In practice, vacuum pumps are preferred and vacuum lines are desirable in part because power requirements to create the required vacuum necessary to draw plastic resin pellets through the lines are lower than the power requirements if the plastic resin pellets are pushed through the lines by a blower or by the exhaust side of a vacuum pump. When vacuum is used, the static pressure within the line may be not much less than atmospheric. When positive pressure is used, the dynamic pressure of the air flowing through the line must be relatively high in order to move an adequate quantity of plastic resin pellets.

As used herein, and in light of the foregoing explanation, the terms "vacuum pump" and "blower" are used interchangeably.

When one or more central vacuum pumps are connected to multiple receivers, a receiver is typically located over each temporary storage hopper, in which the plastic resin pellets are temporarily stored before being molded or extruded. A temporary storage hopper is typically associated with each process machine.

In current practice, the receiver is connected by a control wire to a central control system. The control system works by selectively opening a vacuum valve located in each receiver, allowing one or several vacuum pumps to work in sequence drawing "vacuum", i.e. below atmospheric pressure air, to carry the pellets among and to multiple receivers as individual ones of the receivers, positioned over individual hoppers associated with the individual process machines, require additional plastic resin pellets. The receiver for a given hopper-process machine combination is actuated by opening the vacuum valve located in or near the receiver, causing the receiver to supply plastic resin pellets by gravity feed into the hopper from where the pellets may be fed further by gravity downwardly into the associated process machine.

Large, high capacity industrial vacuum pumps are reliable and are suited to heavy duty industrial use. Large, high capacity vacuum pumps allow long conveying distances for the plastic resin pellets. Currently available large capacity vacuum pumps permit plastic resin pellets to be conveyed over distances of 200 feet or more using vacuum drawn by the pump. Use of such high capacity vacuum pumps results in a big rush of below atmospheric pressure air through the line, carrying the plastic resin pellets over a long distance. The vacuum pump speed is not modulated; the vacuum pump is either "on" or "off." As a result, when the pump is operating, "vacuum", more accurately "air", is drawn at a fixed rate by the vacuum pump through the system.

Operators of plastic manufacturing facilities prefer to buy plastic resin pellets in bulk, in rail cars or tanker trucks. Bulk purchases result in cost savings. Plastic resin pellets delivered in bulk are typically pumped into large silos for storage. In a large manufacturing facility, the distance from a plastic resin pellet storage silo to a process machine may be several hundred feet, or more. Accordingly, when plastic resin pellets are purchased in bulk, a central vacuum-powered conveying system, powered by one or more large, high capacity industrial vacuum pumps, is a necessity.

Typically, large central plastic resin pellet conveying systems have one or more vacuum pumps, each typically being from 5 to 20 horsepower. These central systems include central controls connected by wire to each receiver associated with each process machine in the facility. Typically eight, sixteen, thirty-two or sixty-four receivers, each associated with a process machine, may be connected to and served by the central plastic resin pellet vacuum conveying system. Of course, the higher the number of receivers served by the system, the higher the cost. The central control is connected by wire to each receiver and is used to signal when a receiver is empty and therefore needs and should receive granular resin material. The central control, wired to each receiver, does not measure vacuum level at the receiver and is not in any way used to moderate or modulate operation of the vacuum pump.

A factor to be considered in designing such a system is the speed of the plastic resin pellets as they flow through a conduit as the plastic resin pellets are carried by the moving air stream drawn by the vacuum pump. If air flow is too slow, the plastic resin pellets fall out of the air stream and lie on the bottom of the conduit, with resulting risk of clogging the conduit. If air flow is too fast, the plastic resin pellets can skid along the conduit surface. In such case, harder, more brittle plastic resin pellets may be damaged, resulting in dust within the conduit, which when drawn into the vacuum pump can damage the vacuum pump and render the system inoperative. Softer plastic resin pellets heat up and can melt from friction when contacting the conduit interior surface. This results in "angel hair"—long, wispy-thin strands of plastic film which eventually clog the conduit and cause the system to shut down.

For these reasons, pneumatic plastic resin pellet conveying systems must be designed to produce desired, reasonable conveying speeds for the plastic resin pellets.

Currently, conveying speed of the plastic resin pellets is most often controlled by controlling air flow, measured in cubic feet per minute, and varying the desired and designed cubic feet per minute based on conduit diameter, with a larger diameter conduit requiring more cubic feet per minute of air flow to maintain proper air flow speed through the conduit. Controlling air flow, measured in cubic feet per minute, is conventionally done by specifying the vacuum pump capacity; vacuum pump speed modulation is not within the state of the art.

Controlling cubic feet per minute of air flow is an indirect way of controlling plastic resin pellet speed as the plastic resin pellets flow through a conduit of a given diameter. Typically, a 2 inch diameter conduit requires about 60 cubic feet per minute of air flow to convey typical plastic resin pellets. A 2½ inch diameter conduit typically requires about 100 cubic feet per minute of air flow to convey typical plastic resin pellets. To achieve these desired air flow volume flow rates, a designer must carefully match the horsepower of a vacuum pump, which has a given cubic feet of air per minute rating, to a selected size conduit, taking into consideration the average distance the plastic resin pellets must be conveyed through the conduit from a storage silo to a receiver or loader (because resin conveyance systems are not designed for modulation of vacuum pump speed for the reason noted above—a vacuum pump speed modulation is not within the state of the art). If this results in selection of a 5 horsepower blower/vacuum pump, then a given facility may require several such blowers/vacuum pumps, with each blower/vacuum pump supplying only a selected number of receivers.

A single plastic resin molding or extruding facility might theoretically require a 20 horsepower blower and the corresponding cubic feet per minute capability for conveyance provided by the single blower to meet the total conveying requirements for plastic resin pellets throughout the facility. However, a single twenty horsepower blower would result in far too high a conveying speed for the plastic resin pellets through any reasonable size conduit. As a result, the conveying system for the plastic resin pellets in a large facility is necessarily divided and powered by three or four smaller blowers, resulting in three or four different, separate systems for conveyance of plastic resin pellets. Sometimes several blowers are connected to a single set of receivers, with one or more of the extra blowers turning "on" only when required to furnish the required extra cubic feet per minute of air flow. This is controlled by a central station monitoring all receivers and all blowers, with the central station being programmed to maintain all of the hoppers associated with the process machines in a full condition, wherever those hoppers are located throughout the facility.

Even with careful planning and design, results achieved by such pneumatic plastic resin pellet conveying systems are not consistent. Air flow speed and cubic feet per minute capacity of blowers often vary and are outside of selected design and specification values.

INCORPORATION BY REFERENCE

This patent application incorporates by reference the disclosures of U.S. Pat. Nos. 9,371,198; 9,604,793; 9,550,635; 9,550,636; and 8,753,432.

SUMMARY OF THE INVENTION

The instant invention provides an improvement to known pneumatic plastic resin pellet conveying systems, reducing the costs of those systems while providing consistent control of delivered cubic feet per minute of air for individual receivers. The invention facilitates easy expansion of the pneumatic plastic resin pellet conveying system as needs grow.

Air flow control devices, desirably of the type disclosed herein and of the type disclosed in U.S. Pat. No. 9,371,198; in U.S. Pat. No. 9,604,793; in U.S. Pat. No. 9,550,635; and in U.S. Pat. No. 9,550,636 all are suitable for use in the practice of this invention.

Use of these air flow regulators allows one large vacuum pump to be used without risk to the system or to the resin being conveyed. An added advantage of a very large vacuum pump is that it can fill multiple receivers simultaneously with resin. As used herein, the term "receiver" denotes the type of apparatus disclosed in U.S. Pat. Nos. 6,089,794; 7,066,689, and 8,753,432. The disclosures of these patents are hereby incorporated by reference.

In one of its aspects, this invention provides apparatus for conveying granular plastic resin material from a supply to receivers that retain and dispense the resin when needed by a process machine. The apparatus desirably includes a vacuum pump, a first air flow regulator connected to the suction head of the vacuum pump, and a primary conduit of a first diameter connecting the receivers to the air flow regulator. In this aspect, the invention preferably further includes at least one auxiliary component such as a hopper for supply of an additive such as regrind, color, a release agent, and the like, and/or such as a gravimetric blender preparing a blend of such additives, and/or a dryer, and/or some other component requiring conveyance of resin or other material to or from the component, a second air flow regulator, and a secondary conduit of a second diameter connecting the auxiliary component(s) to the second air flow regulator. The second air flow regulator connects, via a conduit of the second diameter, to the primary conduit. The first diameter is larger than the second diameter and the first air flow regulator typically permits higher air flow rates than does the second air flow regulator. The auxiliary component(s) typically may connect directly to a receiver to deliver an additive or other material to the receiver. The air flow regulators and the associated conduits supply and control the vacuum needed to convey the resin from the resin supply to the receiver and to convey additive or other material from the auxiliary component(s) to a receiver. However, neither the resin nor the additive or other material passes through the air flow regulators nor through the conduits in which the regulators are located.

In a second one of its aspects, this invention provides apparatus for conveying granular plastic resin material from a supply to receivers that retain and dispense the resin when needed by a process machine where the apparatus includes a vacuum pump, a primary conduit of a first diameter connecting the receivers to the vacuum pump, and a plurality of first air flow regulators, one preferably associated with each receiver, with each first air flow regulator preferably being positioned in the conduit connecting the associated receiver to the vacuum pump. In this one of its aspects, the apparatus of the invention preferably further includes at least one auxiliary component of the type noted above, at least one second air flow regulator, and a second conduit of a second diameter connecting the auxiliary component to the second air flow regulator. The second air flow regulator connects, preferably via a conduit of the second diameter, to the primary conduit upstream of the first air flow regulators. The first diameter conduit is preferably larger than the second diameter conduit and the first air flow regulator(s) preferably permit higher air flow than does the second air flow regulator(s). In this one of its aspects, the invention is consistent with the aspect addressed above in that neither the resin nor any additive or other material passes through the air or vacuum flow regulators and the conduits in which the regulators are located. The air flow regulators supply and control vacuum needed to convey the resin from the resin supply to the receivers and vacuum needed to convey the additive(s) and other material(s) from the auxiliary components directly into the receivers, by controlling the level of vacuum propagated from the downstream vacuum pump through the system. The auxiliary components are connected directly to the receivers to deliver the additive(s) and/or other material(s) into the receivers; the receivers are similarly connected directly to the resin supply to receive resin directly from the supply.

In still yet another one of its aspects, this invention provides apparatus for conveying granular plastic resin material from a supply to receivers that retain and dispense the resin when needed by a process machine where the apparatus includes a vacuum pump, a first air flow regulator connected to the suction head of the vacuum pump, a primary conduit of a first diameter connecting receivers to the air flow regulator, a second air flow regulator, and a secondary conduit of a second diameter connecting auxiliary components to the second air flow regulator. The second air flow regulator preferably connects, via a conduit of the second diameter, to the primary conduit upstream (considering the direction of air flow) of the first air flow regulator. The first diameter is preferably larger than the second diameter, and the first air flow regulator preferably permits higher air flow than does the second air flow regulator.

In still yet another one of its aspects, this invention provides apparatus for conveying granular plastic resin material from a supply to receivers that retain and dispense the resin when needed by a process machine. In this one of its aspects, the inventive apparatus includes a vacuum pump, a primary conduit of a first diameter connecting the receivers to the vacuum pump, and a plurality of first air flow regulators, preferably one associated with each receiver, with each first air flow regulator being positioned in the primary conduit connecting the associated receiver to the vacuum pump. In this one of its aspects, the apparatus of the invention further includes at least one auxiliary component affiliated with an associated receiver. The apparatus further includes a second air flow regulator, a secondary conduit of a second diameter connecting the auxiliary component(s) to the second air flow regulator, with the second air flow regulator connecting, via a conduit of the second diameter, to the primary conduit between the associated receiver and the first air flow regulator. The first diameter is larger than the second diameter; the first air flow regulator(s) permit higher air flow than the second air flow regulator.

In another one of its aspects, this invention provides methods for conveying granular plastic resin material from a supply thereof to at least one receiver, for temporary storage of the granular plastic resin material in the receiver until the material is needed by a process machine associated with the receiver. In practice of the methods, a conduit is positioned with an open end in the supply of granular plastic resin material. The methods proceed with drawing vacuum through the conduit at a second end of the conduit, thereby conveying granular plastic resin material out of the supply and along the conduit. A receiver is provided connected to the conduit for receipt of granular resin material from the conduit. The methods further proceed with positioning an air flow regulator in the conduit to limit air flow within the conduit to a pre-selected value and collecting, in the receiver, resin entrained within the drawn vacuum.

This method aspect of the invention further may include supplying the conduit in two segments, with one segment having the open end, as recited in the preceding paragraph, and connecting the receiver with the supply. The second segment of the conduit connects the receiver with a source drawing the vacuum. The methods in this aspect yet further include positioning the air flow regulator in the second conduit segment.

In still another one of its aspects, this invention provides a method for providing granular resin material from a supply thereof and auxiliary material from a source thereof, with both the granular resin material and the auxiliary material being supplied to at least one receiver. The receiver functions to provide temporary storage of the granular resin material and the auxiliary material until the materials are needed by a process machine associated with the receiver. In this method aspect of the invention, the methods may commence by positioning a first conduit with an open end in the supply of granular plastic resin material. The methods may next proceed with drawing vacuum through the first conduit at a second end of the conduit, thereby conveying granular plastic resin material out of the supply and along the conduit. The method further proceeds by providing a receiver connected with the first conduit for receipt of granular resin material from the first conduit. An air flow regulator is positioned in the first conduit to limit air flow within the conduit to a pre-selected value. The methods still further proceed by providing a second conduit connecting an auxiliary device with the first conduit, with the auxiliary device being positioned to deliver auxiliary material to the receiver as needed. The methods yet still further proceed by positioning a second air flow regulator in the second conduit and by collecting in the receiver resin entrained in the drawn vacuum that is conveyed through the first conduit, and by collecting in the receiver any auxiliary material received from the auxiliary device. In these method aspects of the invention, the second conduit is preferably connected to the first conduit upstream of the first air flow regulator.

In still yet another one of its aspects, this invention provides methods for providing granular plastic resin material from a supply thereof and also providing auxiliary material from a source thereof, with both materials being supplied to a plurality of receivers for temporary storage of the granular plastic resin material and the auxiliary material in the receivers until the materials are needed unitarily by a process machine associated with the receiver. In this aspect, the methods commence with positioning a first conduit with an open end in the supply of granular plastic resin material and then draw vacuum through the first conduit at a second end of the conduit, thereby conveying entrained granular plastic resin material out of the supply and along the conduit. The method proceeds with connecting the receivers with a first conduit for receipt of granular resin material from the first conduit and positioning first flow regulators in portions of the first conduit downstream of the receivers to limit air flow to the receivers through the first conduit to a pre-selected value(s). The methods proceed with providing a second conduit connecting at least one auxiliary device with the first conduit; the second auxiliary device is positioned to deliver auxiliary material to at least one of the receivers as needed. Second air flow regulators are positioned in at least some of the portions of the second conduit connecting to the receivers. Resin entrained in the drawn vacuum is collected in the receivers after it has been conveyed through the first conduit. Additionally, the receivers collect any auxiliary material received from the auxiliary device.

Desirably, the auxiliary device may be a hopper, or may be a dryer, or may be a gravimetric blender. Further desirably, the first conduit is preferably of larger diameter than the second conduit. The flow regulators are desirably tubular in nature and vertically oriented for operation.

The foregoing outlines rather broadly features of the invention in order that the detailed description of the invention that follows may be best understood. Additional features and advantages of the invention, as described hereinafter, may form the subject of certain of the claims of the application. It will be appreciated by those skilled in the art that the concepts and specific embodiments disclosed herein may be readily utilized as a basis for modifying or designing apparatus or other methods for carrying out the goals and results attained by this invention. It should also be realized by those skilled in the art that such equivalent implementations do not depart from the spirit and scope of the invention as set forth in the appended claims.

DETAILED DESCRIPTION OF THE INVENTION

Figure 1:
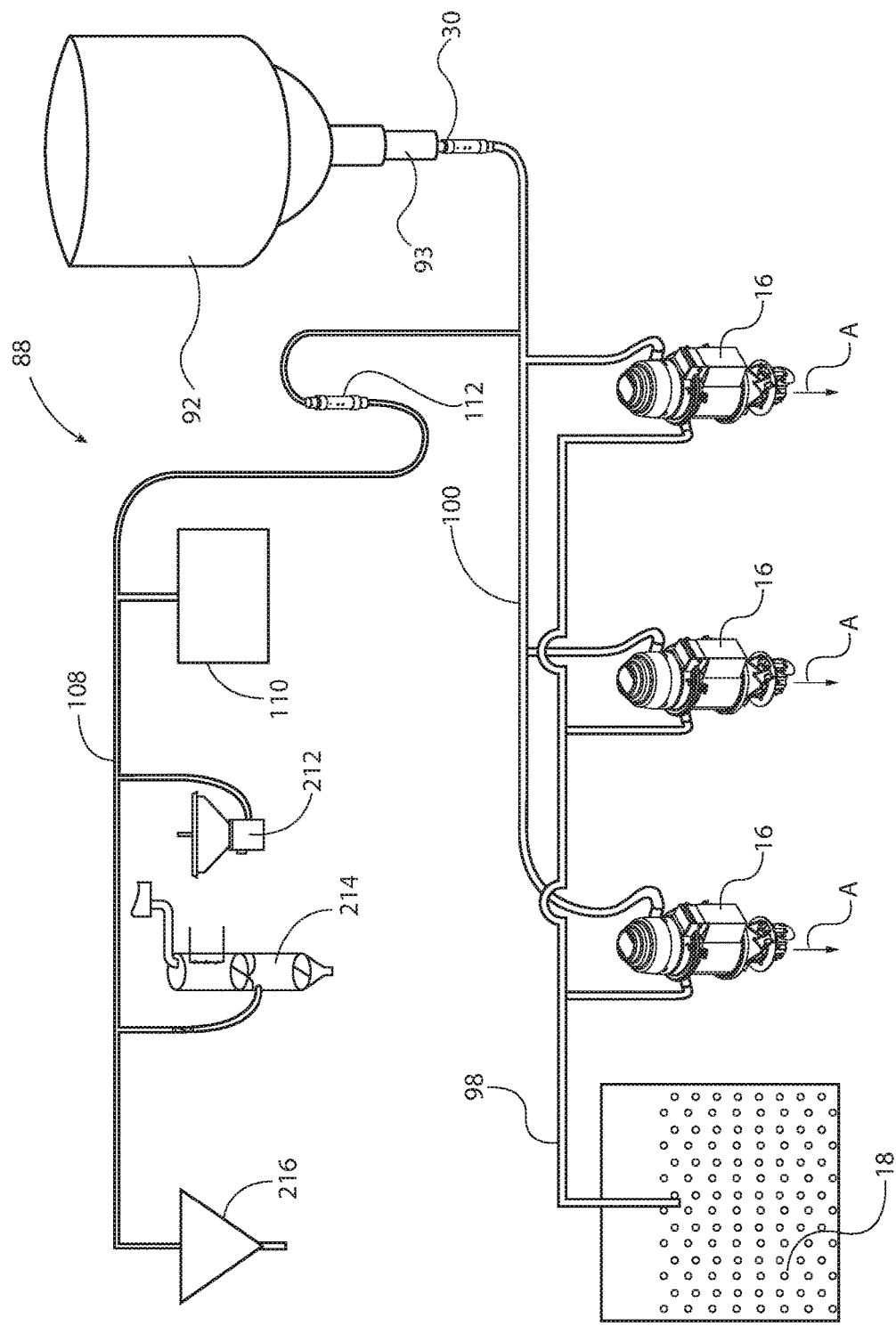
FIG. 1 is a schematic diagram of a resin delivery system according to the invention having plural air flow regulators.

This invention provides pneumatic and vacuum resin delivery systems and apparatus utilizing two or more air flow regulators positioned so that different size resin delivery conduits can be controlled at different flow limits.

In this application, unless otherwise apparent from the context it is to be understood that the use of the term "vacuum" means "air at slightly below atmospheric pressure." The "vacuum" (meaning air at slightly below atmospheric pressure) provides a suction effect that is used to draw granular plastic resin material out of a supply and to convey that granular plastic resin material through various conduits to receivers in which the granular resin material can be temporarily stored before being molded or extruded. Hence, when reading this application it is useful for the reader mentally to equate the term "vacuum" with the term "suction".

A fixed air flow regulator works for one resin conveying line size only. For example, an air flow regulator that is designed to limit flow to 100 SCFM is likely correct for 2 inch line size, as that air flow regulator limits velocity to the desired range for a 2 inch line. If a 1.5 inch line is a part of the system, as may be the case with the instant invention, the flow rate through that line should be reduced to about 70 SCFM. A fixed, non-adjustable CFM regulator cannot do both.

In one of its aspects, this invention places two or more air flow regulators in the resin conveying system at key locations so that smaller, preferably 1.5 inch lines can be used for air flow for auxiliary devices, in addition to conventional 2 inch lines for the main resin conveyance. This permits a desired commodity, such as color pellets or some other additive, to be conveyed by air, the speed of which is controlled by traveling through a lower size preferably fixed air flow regulator while the system functions to deliver granular resin material to a receiver and/or to deliver an additive or other material to that receiver.

This use of multiple flow regulators allowing different line sizes in the same resin conveying system facilitates greater flexibility with consequent cost savings for the purchaser of the resin conveying system.

Using (SCFM) flow regulators to connect different size conveying lines to one vacuum pump is an important aspect of this invention. Providing different size resin conveying lines all connected to one vacuum pump has been tried in the past, but only with fixed valves set in advance to restrict air flow to a preselected level. These valves do not adjust to actual air flow rate. Contrasting, use of air flow regulators that limit maximum conveying air flow to a particular level of SCFM is one of the aspects of this invention.

Also, the invention may use a flow regulator having two settings, with the regulator preferably being solenoid operated as disclosed in U.S. Pat. No. 9,550,635. Controls may be used to select between two flow limits, one better for larger tubing, and one better for smaller tubing.

Referring to the drawings in general and to FIG. 1 in particular, apparatus for conveying granular plastic resin material from the supply to receivers that retain and dispense the resin material when needed by a process machine is illustrated in FIG. 1. The apparatus, which is designated generally 88 in FIG. 1, preferably includes a vacuum pump designated generally 92 and shown schematically in FIG. 1. The vacuum pump preferably includes a vacuum pump suction head 93 also shown schematically in FIG. 1. Connected to the vacuum pump suction head 93 is a suitable airflow regulator 30 shown only in schematic form in FIG. 1, but of the type shown in detail in FIGS. 5 through 18. Airflow regulator 30 receives vacuum drawn by vacuum pump 92 through vacuum drawing conduit 100.

Still referring to FIG. 1, vacuum drawing conduit 100 is connected to a plurality of receivers 16, each of which receives, retains and dispenses, as needed, granular plastic resin material to a process machine, such as an extruder or a molding press, as located preferably below or adjacent to a receiver 16. The process machines are not illustrated in FIG. 1 to enhance the clarity of the drawing. Receivers 16 are preferably of the type disclosed and claimed in U.S. Pat. No. 8,753,452.

Further illustrated in FIG. 1 is a hopper 18 for storage of granular plastic resin material therein and a resin conveying conduit 98, which serves to convey resin drawn from hopper 18 and to deliver the resin to respective receivers 16 as vacuum is drawn by vacuum pump 92, with vacuum propagating upstream through air flow regulator 30, vacuum drawing conduit 100, the various receivers 16, and resin conveying conduit 98 to hopper 18.

Also illustrated in FIG. 1 in schematic form are a group of auxiliary material supply devices which may be receivers, or hoppers, or dryers, or gravimetric blenders, depending on the particular auxiliary material, such as solid color additive, lubricating additive, a regrind of previously used resin material, and the like, which is to be delivered to a receiver 16. In FIG. 1, a hopper for storing a selected auxiliary material has been schematically shown and is designated 216. A dryer has been schematically shown and designated 214. Dryer 214 could be used to deliver dried auxiliary material to receivers 16. Dryer 214 shown schematically in FIG. 1 is preferably of the type disclosed in co-pending U.S. patent application Ser. No. 14/272,721 published 28 Aug. 2014 as United States patent publication 2014/0239533 A1.

Still referring to FIG. 1, a gravimetric blender has been schematically depicted and designated 212. The gravimetric blender may desirably be of the type disclosed in U.S. Pat. No. 6,467,943. Further illustrated in FIG. 1 is an auxiliary component designated 110 and intended to denote generically any type of auxiliary component that might be used with a resin delivery system of the type illustrated in FIG. 1. Such generic auxiliary components could be receivers, hoppers, gravimetric blenders, dryers, and other components commonly used in the plastics molding and extrusion industry, which components require delivery of material via pneumatic or vacuum conveyance. Hopper 216, dryer 214, gravimetric blender 212 and generic auxiliary component 110 are sometimes collectively referred to hereinafter as "auxiliary supply devices."

The auxiliary supply devices are all connected to vacuum pump 92 via a secondary vacuum drawing conduit 108. Positioned within secondary vacuum drawing conduit 108 is a secondary air flow regulator 112. The term "secondary" does not reduce the importance of air flow regulator 112 but indicates that air flow regulator 112 is located in secondary vacuum drawing conduit 108.

As illustrated in FIG. 1, secondary air flow regulator 112 is in a vertical orientation with secondary vacuum drawing conduit 108 entering and supplying air to secondary air flow regulator 112 at the bottom of secondary air flow regulator 112. Air, more specifically vacuum, is drawn out of the top of secondary air flow regulator 112 by vacuum pump 92 as illustrated in FIG. 1. Secondary vacuum drawing conduit 108 desirably connects to vacuum drawing conduit 100 as illustrated in FIG. 1 so that a single vacuum pump 92 may serve both the principal resin conveying conduit 98 and vacuum drawing conduit 100, as well as serving the auxiliary supply devices via secondary vacuum drawing conduit 108. Both the primary air flow regulator 30 and the secondary air flow regulator 112 are preferably one of the types of air flow regulators illustrated in FIGS. 5 through 18 hereof. Note that air flow regulators 30 and 112 are vertically oriented, for air flow therethrough in a vertically upwards direction.

Secondary vacuum drawing conduit 108 connects to primary vacuum drawing conduit 100; neither of these conduits carries resin material. These conduits draw the vacuum that is used to convey resin material from supply 18 into receivers 16 via principal resin conveying conduit 98 and to convey additives and/or other materials from the auxiliary supply devices into receivers 16 or possibly directly into a process machine. The connections between the auxiliary supply devices and receivers 16 for delivery of the additives and/or other materials from the auxiliary supply devices to a receiver 16 are not illustrated in FIG. 1 nor in any of the other drawings, in order that the drawings be clear.

Figure 2:
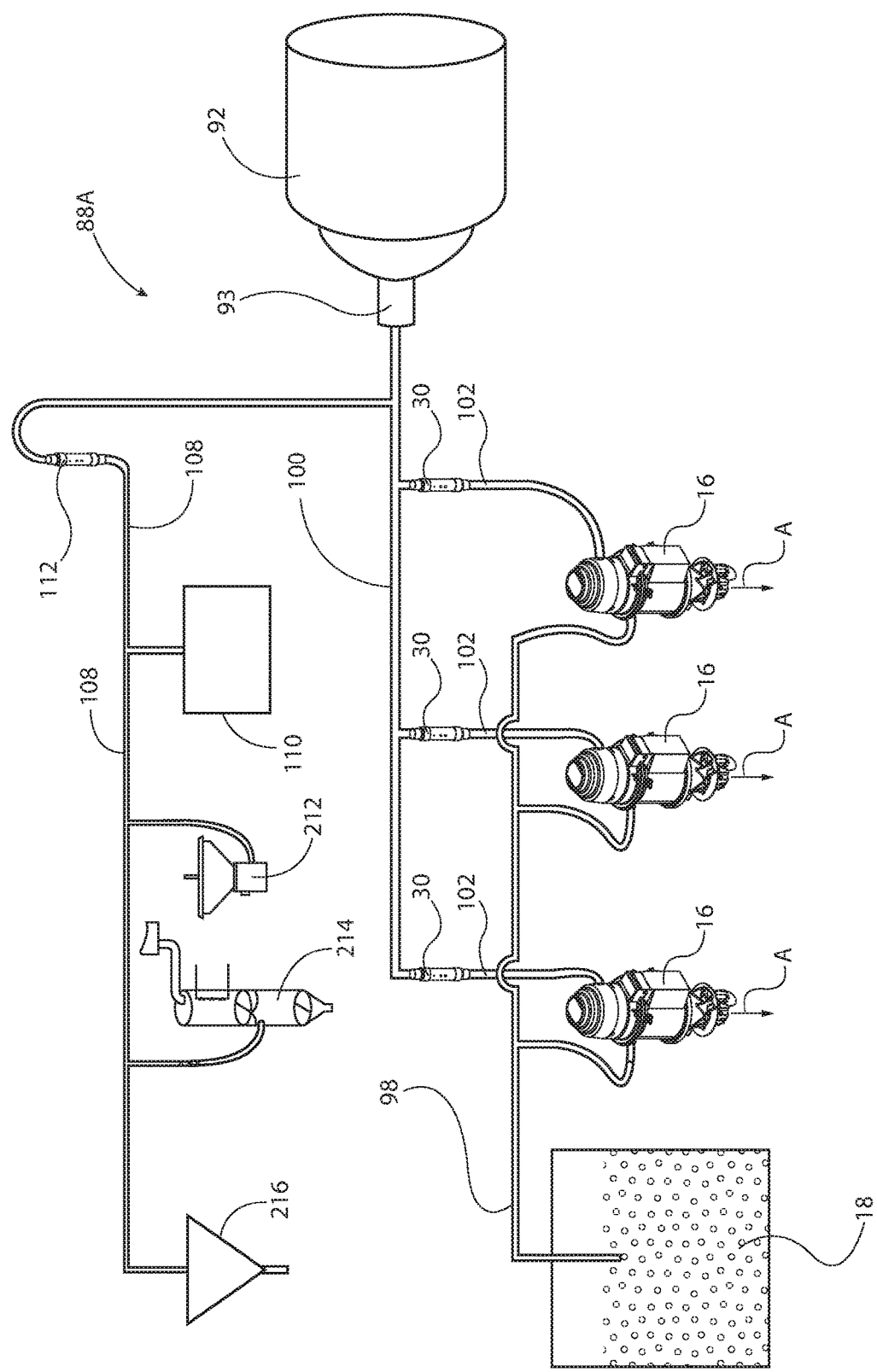
FIG. 2 is a schematic diagram of a second resin delivery system according to the invention having plural air flow regulators.

FIG. 2 shows an alternate embodiment of a resin conveying system designated 88A. FIG. 2, as with FIG. 1, depicts a vacuum pump 92 shown in schematic form having a vacuum pump suction head 93 also depicted in schematic form. In the embodiment illustrated in FIG. 2, vacuum drawing conduit 100 leads horizontally directly into and communicates with vacuum pump suction head 93. In the embodiment illustrated in FIG. 2, an air flow regulator 30 is provided for each receiver 16, with the air flow regulator 30 for a respective receiver 16 preferably being located in a portion of a connection conduit 102 that connects a respective receiver 16 to vacuum drawing conduit 100. In FIG. 2, each air flow regulator 30 is depicted in a vertical orientation, just as is air flow regulator 30 depicted in a vertical orientation in FIG. 1. Each receiver 16 is connected by a connection conduit 102 to vacuum drawing conduit 100 with each air flow regulator 30 forming a portion of connection conduit 102.

In FIG. 2, as in FIG. 1, a first conduit 98 serves to convey granular plastic resin from hopper 18 to the respective receivers in response to vacuum drawn by vacuum pump 92 as that vacuum propagates from vacuum pump 92 through second conduit 100, connection conduits 102, receivers 16, and resin conveying conduit 98 to hopper 18.

Further illustrated in FIG. 2 is another collection of auxiliary supply devices, namely hopper 216, dryer 214, gravimetric blender 212, and generic auxiliary supply device 110, that may be similar or identical to the auxiliary supply devices illustrated in FIG. 1. The auxiliary supply devices in FIG. 2 are connected by a secondary vacuum drawing conduit 108 to the primary vacuum drawing conduit 100 so that vacuum pump 92 may serve both the resin conveying structure shown at the lower part of FIG. 2 and the auxiliary supply devices illustrated at the upper portion of FIG. 2. Similarly to the structure illustrated in FIG. 1, a secondary air flow regulator 112 is positioned in secondary vacuum drawing conduit 108 and preferably oriented so that air flow through secondary air flow regulator 112 is in a vertical direction, upwardly therethrough. Secondary vacuum drawing conduit 108 leading from secondary air flow regulator 112 connects directly to primary vacuum drawing conduit 100.

In FIG. 2 there is no air flow regulator 30 interposed between vacuum pump 92 and the collection of auxiliary devices 110 and secondary air flow regulator 112, as there is in FIG. 1. As a result, in the FIG. 2 apparatus, primary vacuum drawing conduit 100 may lead into vacuum pump 92 horizontally, as shown.

In FIG. 2, each receiver 16 has an individual air flow regulator 30 associated with the receiver. As with the system illustrated in FIG. 1, in FIG. 2 resin is conveyed through conduit 98 but, unlike FIG. 1, the air flow regulators 30 are in conduits 102 which lead to vacuum drawing conduit 100. The resin material does not pass through air flow regulators 100. Similarly respecting the secondary air flow regulator 112, additive or other material does not pass therethrough. Additive and/or other material goes directly from the auxiliary supply devices to receivers 16 or perhaps directly to a process machine. Vacuum drawn through secondary vacuum drawing conduit 108 and regulated by secondary air flow regulator 112 controls the vacuum force that may be used to convey additive and/or other material from the auxiliary supply devices into receiver 16. As with FIG. 1, both the primary air flow regulators 30 and the secondary air flow regulator 112 are preferably of one of the types of air flow regulators illustrated in FIGS. 5 through 18 hereof. Note that air flow regulators 30 and 112 in FIG. 2 are all oriented with their central/cylindrical axes vertical, for vertically upward air flow through the air flow regulator.

Figure 3:
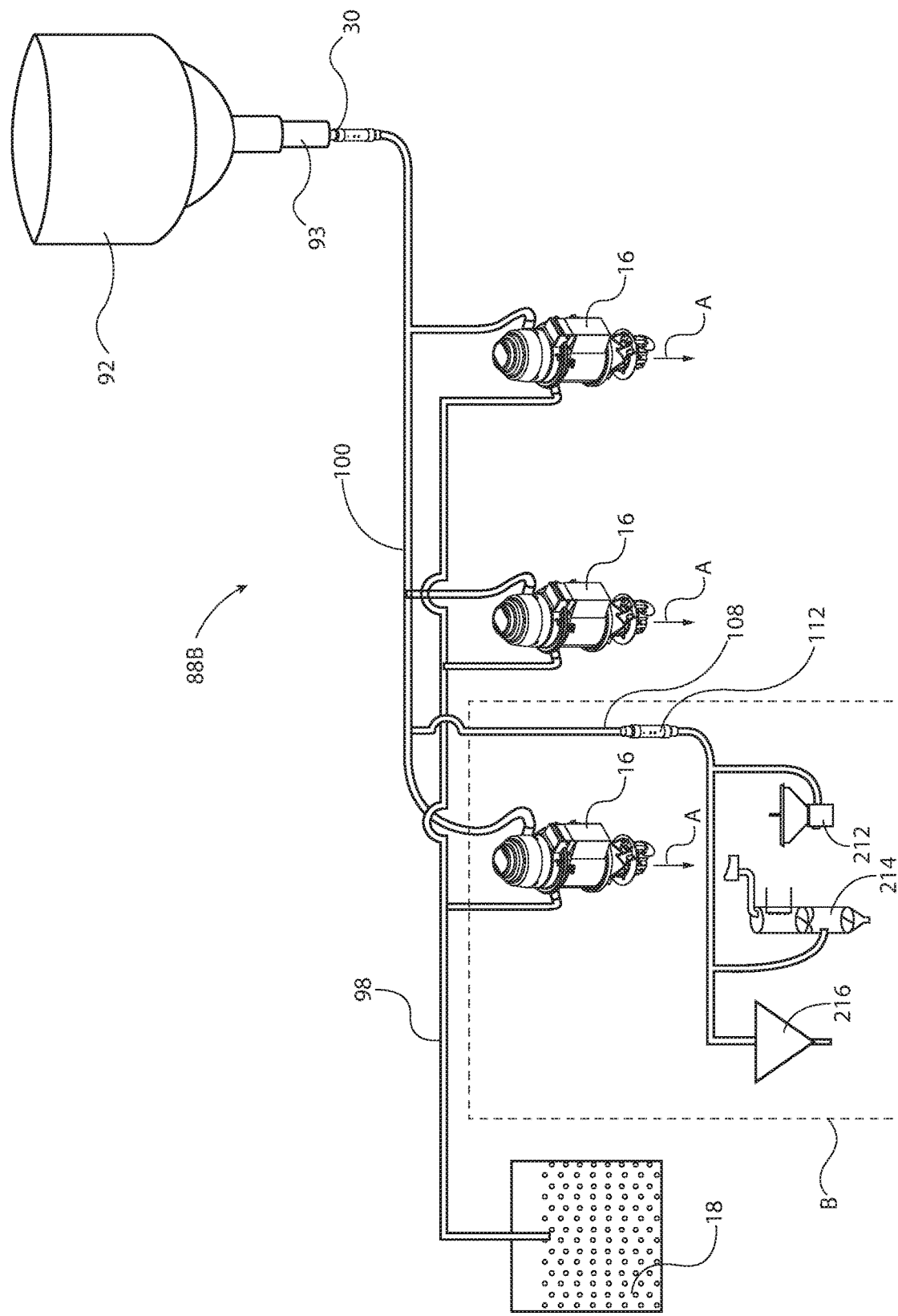
FIG. 3 is a schematic diagram of a third resin delivery system according to the invention having plural air flow regulators.

FIG. 3 illustrates yet another alternate embodiment of a resin conveying system, where this alternate embodiment of the resin conveying system has been designated 88B. FIG. 3, similarly to FIGS. 1 and 2, depicts a vacuum pump 92 shown in schematic form having a vacuum pump suction head 93 also depicted in schematic form, with an air flow regulator 30, in the same manner as illustrated in FIG. 1 serving to limit air flow through receivers 16 as drawn by vacuum pump 92 through vacuum drawing conduit 100 and also through resin conveying conduit 98.

In FIG. 3, a dotted line B surrounding one receiver 16 and three auxiliary supply devices, namely a hopper 216, a dryer 214, and a gravimetric blender 212, denotes that these auxiliary supply devices may all serve a single receiver 16, supplying additives and/or other materials of various types, such as solid colorant, regrind material, mold release agents and the like, to receiver 16 for subsequent supply to an associated process machine. In the arrangement illustrated in FIG. 3, a single secondary air flow regulator 112 is provided and is associated with the auxiliary supply devices 212, 214, 216 and receiver 16 located within dotted line B. A secondary vacuum drawing conduit 108 serves the three auxiliary supply devices 212, 214, 216 within dotted line B and connects those auxiliary supply devices via secondary air flow regulator 112 to primary vacuum drawing conduit 100. In the system illustrated in FIG. 3, as with the systems illustrated in FIGS. 1 and 2, neither resin material nor additives nor other materials pass through air flow regulators 30 and 112. Receivers 16 are preferably of the type disclosed and claimed in U.S. Pat. No. 8,753,432.

Figure 4:
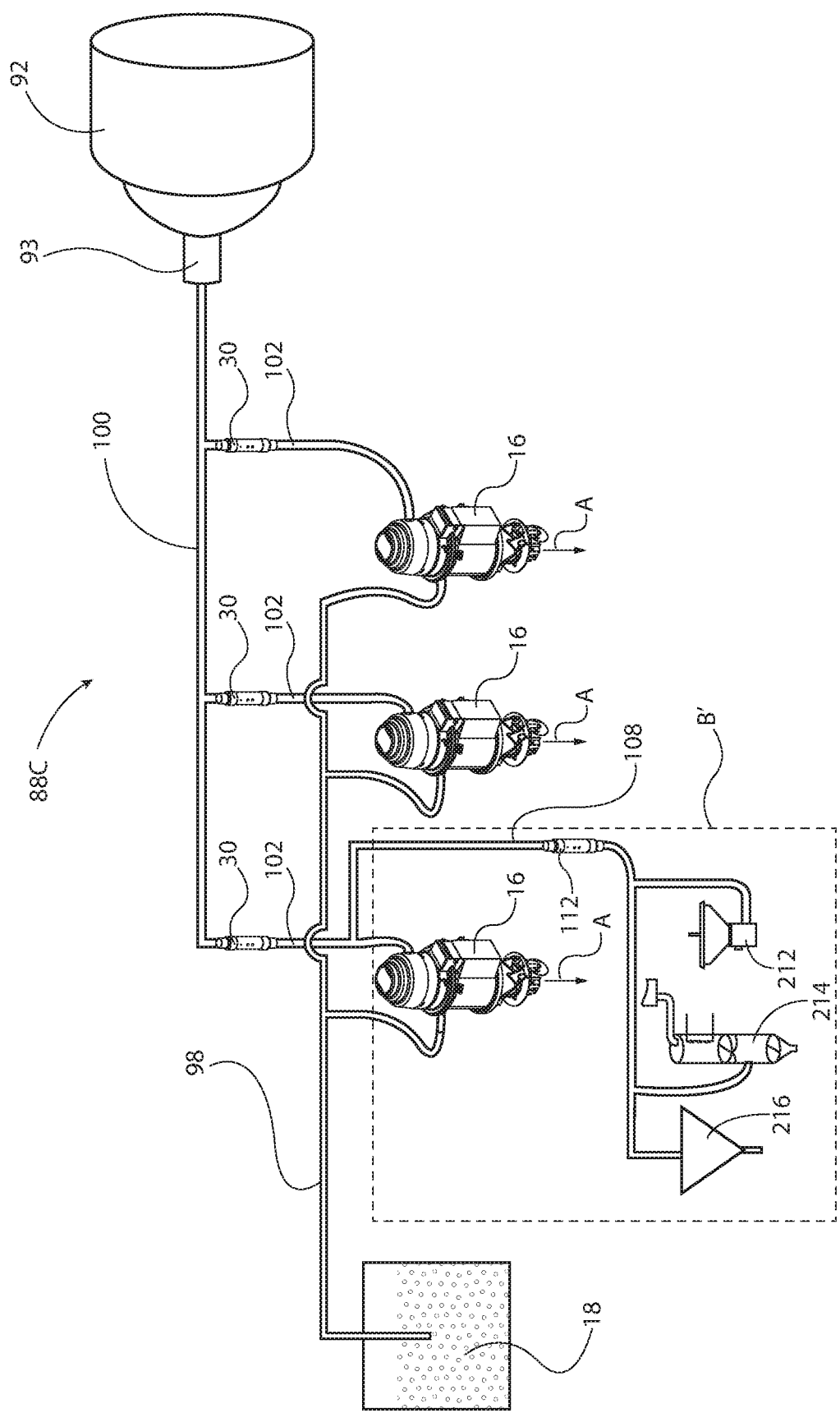
FIG. 4 is a schematic diagram of a fourth resin delivery system according to the invention having plural air flow regulators.
Figure 5:
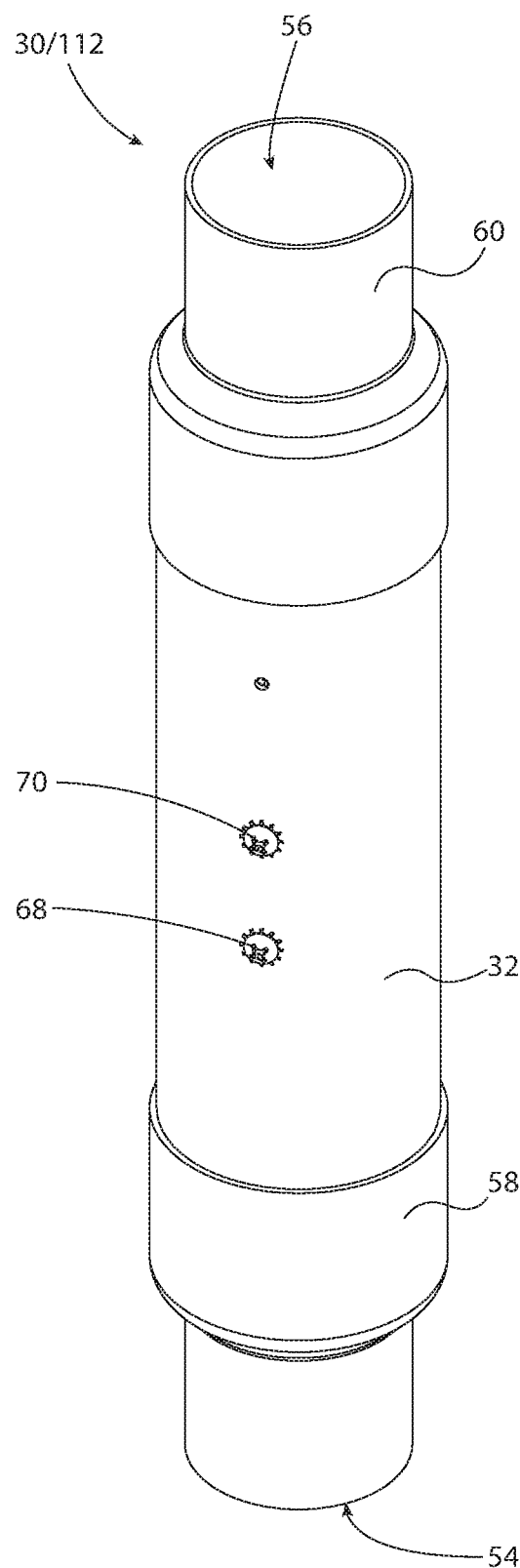
FIG. 5 is an isometric view of the exterior of an air flow regulator portion of the apparatus for pneumatically conveying granular plastic resin, as disclosed in U.S. Pat. Nos. 9,371,198 and 9,604,793.
Figure 6:
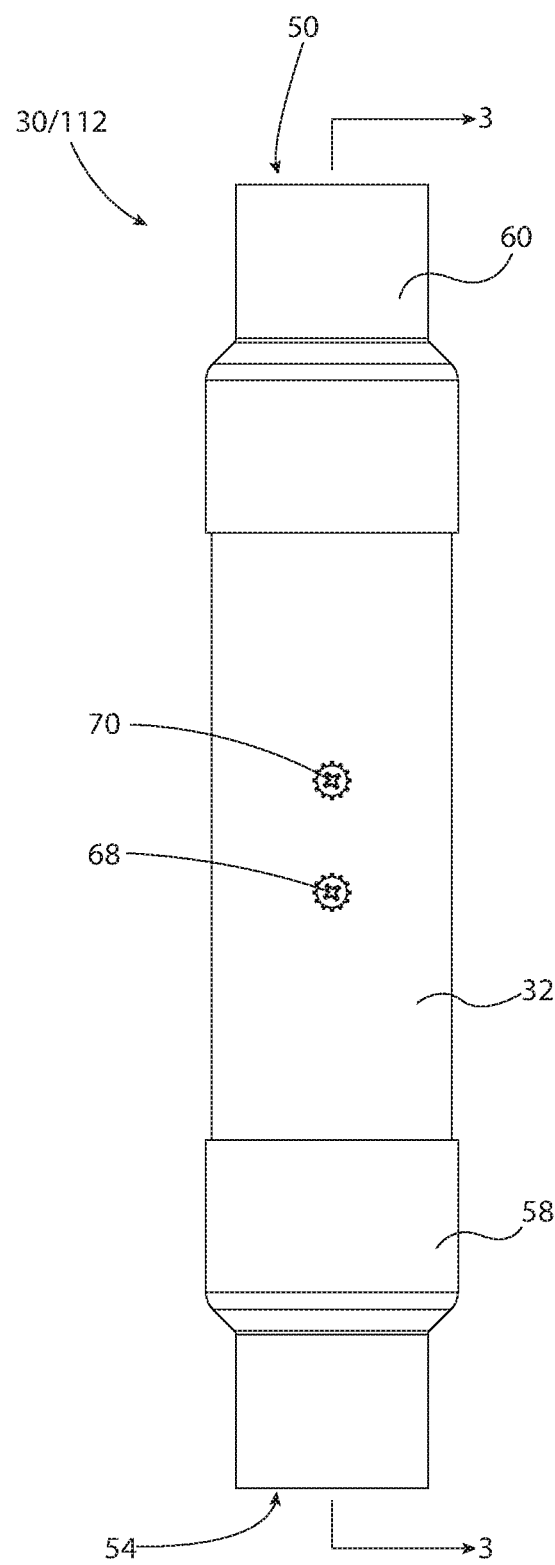
FIG. 6 is a front elevation of the air flow regulator illustrated in FIG. 5.

FIG. 4 illustrates still yet another embodiment of a resin conveying system, where this embodiment has been designated 88C. In the embodiment illustrated in FIG. 4, once again a dotted line B' has been placed around a receiver 16 and three associated auxiliary supply devices 212, 214, 216 for supplying various additives and/or other materials to receiver 16 and hence to a process machine associated with the receiver 16. Dotted line B' in FIG. 4 corresponds generally to dotted line B in FIG. 3 and the auxiliary supply devices 212, 214, 216 illustrated in FIG. 4 correspond to the auxiliary supply devices 212, 214, 216 illustrated in FIGS. 1, 2 and 3. Similarly, secondary air flow regulator 112 illustrated in FIG. 4 corresponds to secondary air flow regulator 112 illustrated in FIG. 3.

In FIG. 4, secondary vacuum drawing conduit 108 connects to vacuum drawing conduit 100 and specifically to a branch 102 thereof that connects the receiver 16 located within dotted line B' to a primary air flow regulator 30, which in turn has its outlet connected to primary vacuum drawing conduit 100. As with FIGS. 1 through 3, both the primary air flow regulators 30 and the secondary air flow regulator 112 are preferably of one of the types of air flow regulators illustrated in FIGS. 5 through 18 hereof. Air flow regulators 30 and 112 in FIG. 4 are all oriented with their central axes vertical, for vertically upward air flow through the air flow regulator. As with FIGS. 1 through 3, receivers 16 are all preferably of the type disclosed and claimed in U.S. Pat. No. 8,753,432.

In the resin conveying systems illustrated in FIGS. 1 through 4, the secondary vacuum drawing conduit 108 will normally be of a smaller diameter than the primary vacuum drawing conduit 100. Typically, secondary vacuum drawing conduit 108 may be 1½ inches in diameter, while primary vacuum drawing conduit 100 may be 2 inches in diameter. Of course, other diameters for the vacuum drawing conduits may be used depending on the type of resin, additives and/or other materials being drawn through the respective vacuum drawing conduits, the power of vacuum pump 92, and other variables.

In the configurations of the resin conveying systems illustrated in FIGS. 3 and 4, only one dotted line has been provided around one receiver and its associated auxiliary supply devices. In practice of the invention, associated auxiliary supply devices and secondary vacuum drawing conduits would preferably be provided for each of the individual receivers shown schematically in FIGS. 3 and 4. In the system illustrated in FIG. 4, as with the systems illustrated in FIGS. 1, 2, and 3, resin material, additives and/or other materials do not pass through air flow regulators 30 and 112.

During operation of the resin conveying systems shown schematically in FIGS. 1 through 4, upon actuation of vacuum pump 92, vacuum is drawn at vacuum pump suction head 93. This vacuum, as it propagates to hopper 18 through receivers 16, serves to draw resin out of hopper 18 and into respective receivers 16. In the embodiments illustrated in FIGS. 2 and 4, individual air flow regulators 30 limit the suction or vacuum drawn by vacuum pump 92 through a given associated receiver 16, which vacuum then propagates through receivers 16 via resin conveyance line 98 to resin supply 18 to draw resin from the supply 18 into receivers 16. In the embodiments illustrated in FIGS. 1 and 3, a single air flow regulator 30 limits the vacuum drawn through all receivers 16 that form a portion of the granular resin conveying systems illustrated in FIGS. 1 and 3.

Referring to FIGS. 1 through 4, both the primary air flow regulators 30 and the secondary air flow regulators 112 are preferably in the general form of a vertically oriented tube, preferably having inlet and outlet ends 54, 56 respectively. The tubular character of the preferred air flow regulators 30 and 112 is apparent from FIGS. 5 through 18, where air flow regulator 30/112 each preferably includes a vertically oriented exterior tube 32, with open-end caps 58, 60 defining and preferably providing open inlet and outlet ends 54, 56 respectively. End caps 58, 60 are open, preferably of generally cylindrical configuration, and are preferably configured to fit closely about vertically oriented tube 32 so as to provide a substantially air tight fit between end caps 54, 56 and tube 32.

Figure 7:
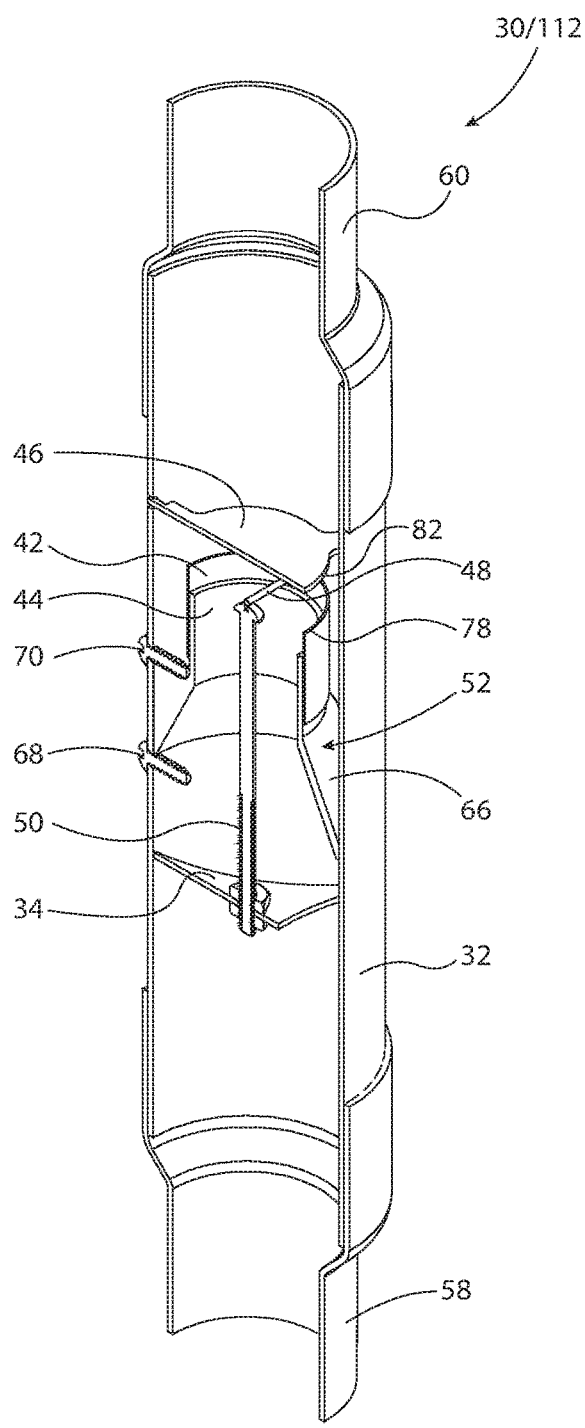
FIG. 7 is a slightly rotated sectional view of the air flow regulator illustrated in FIGS. 5 and 6, with the section taken at arrows 3-3 in FIG. 6.

As illustrated in FIG. 7, air flow regulator 30 or 112 preferably includes, within vertically oriented exterior tube 32, a horizontally positioned plate 46, which is oriented perpendicularly to the axis of tube 32. Plate 46 is preferably configured as a circular disk of lesser diameter than the inner diameter of vertically oriented tube 32, with plate 46 further preferably including three legs extending outwardly from the circular interior disk portion of plate 46. Legs of plate 46 are designated 62 in FIG. 11, while the circular interior portion of plate 46 is designated 64 in FIG. 11. Plate 46 is secured to the interior of vertically oriented outer tube 32 by attachment of legs 62 to the interior surface of tube 32. Any suitable means of attachment, such as by welding, adhesive, mechanical screws, or end portions of legs 62 defining tabs fitting into slots within tube 32 as shown in FIG. 7, may be used.

Figure 8:
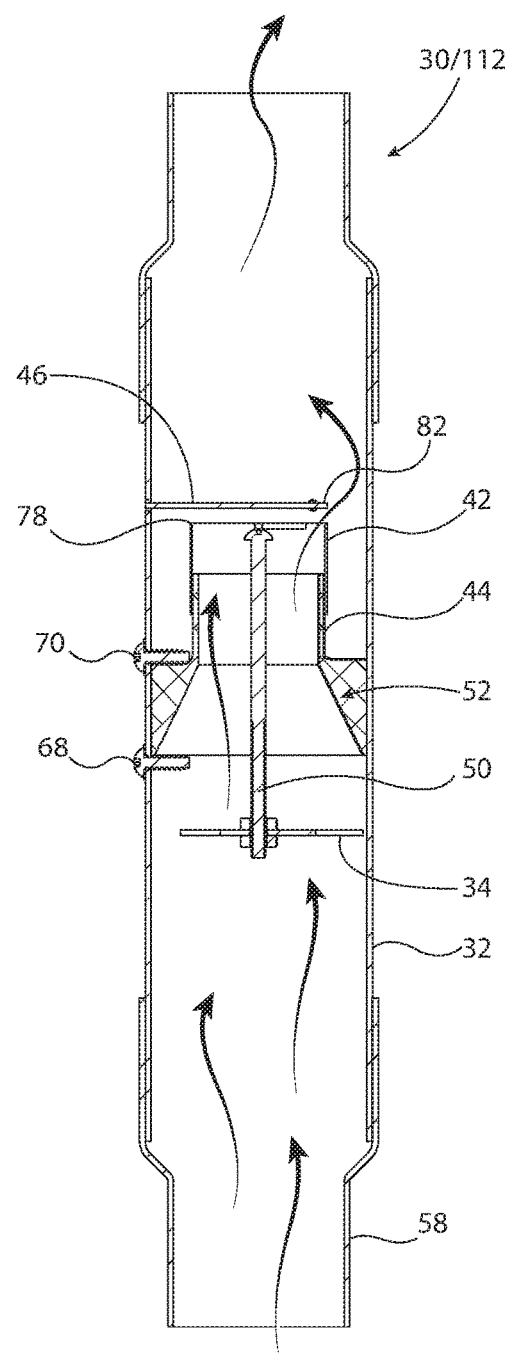
FIG. 8 is a sectional view in elevation of the air flow regulator illustrated in FIGS. 5, 6 and 7, with the section taken at lines and arrows 3-3 in FIG. 6, with air flow through the air flow regulator being depicted in FIG. 8 by curved dark arrows.
Figure 9:
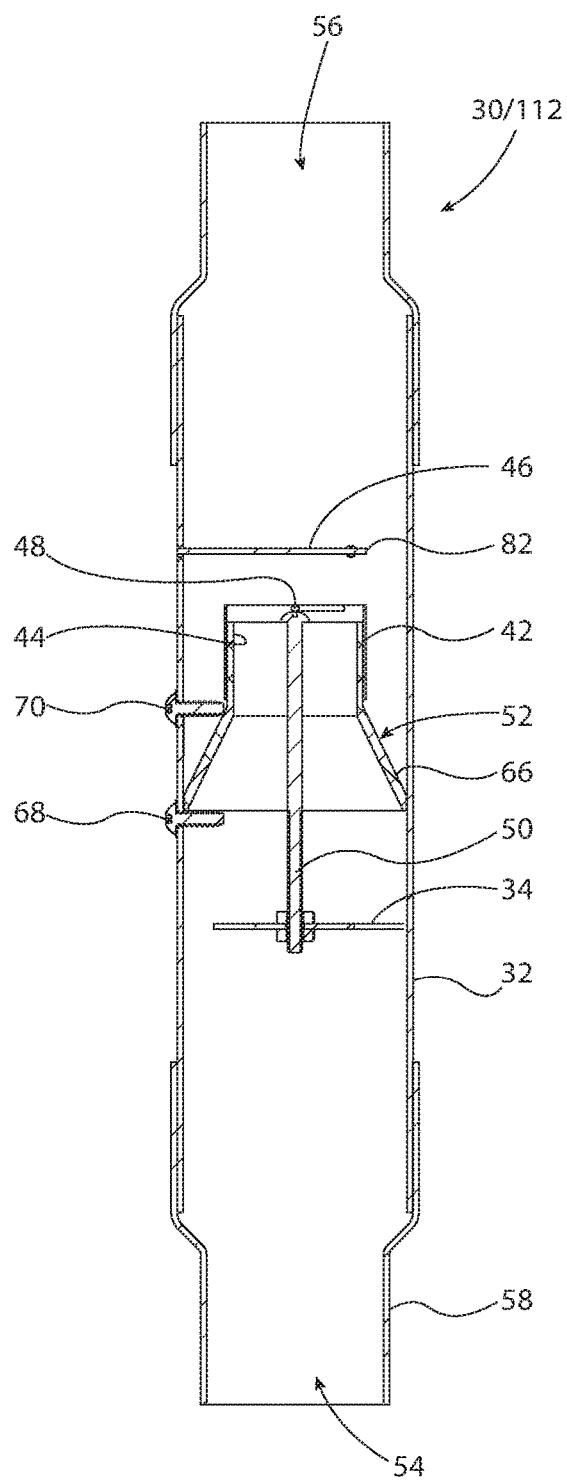
FIG. 9 is a sectional view in elevation, similar to FIG. 8, of the air flow regulator illustrated in FIGS. 5 through 8, but with the air flow regulator internal parts in position whereby there is no air entering the air flow regulator and hence there is no air flow upwardly through the air flow regulator, in contrast to the condition with such air flow shown in FIG. 8.

As shown in FIGS. 7, 8, and 9, a baffle 52 is positioned within vertically oriented outer tube 32, below plate 46. Baffle 52 has a lower conical portion 66 and an upper cylindrical portion 44, with cylindrical portion 44 defining a fixed internal tubular segment of air flow regulators 30 and 112. Baffle 52 is preferably retained in position by a pair of screws designated 68, 70 respectively. Baffle 52 preferably rests on screw 68. Screw 70 preferably fits against the fixed internal tubular segment 44 portion of baffle 52 to secure baffle 52 in position within vertically oriented external tube 32. Lateral force applied by screw 70 in a direction perpendicular to the axis of vertically oriented external tube 32, with screw 70 in contact with fixed internal tubular segment 44, serves to effectively retain baffle 52 against movement within vertically oriented external tube 32.

Figure 10:
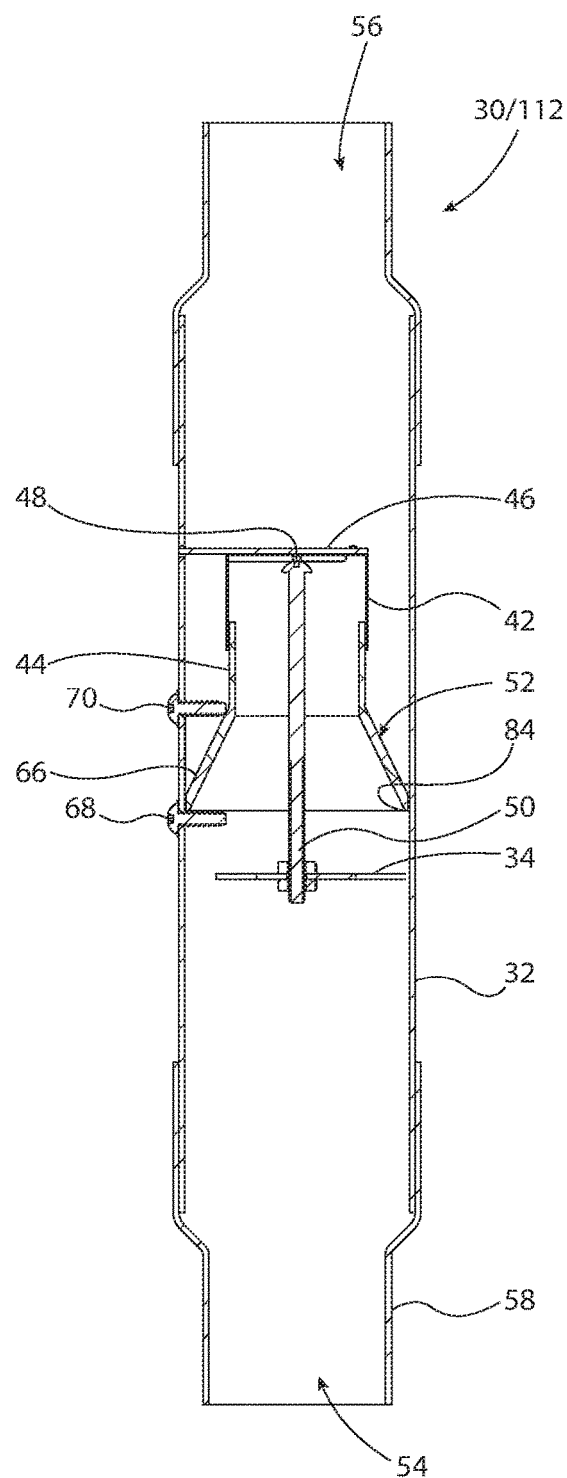
FIG. 10 is a sectional view in elevation, similar to FIGS. 8 and 9, of the air flow regulator illustrated in FIGS. 5 through 9, but with the air flow regulator internal parts in position where there is an excessive amount of air, over and above the preselected design limit, attempting to enter the air flow limited but there is no air flowing upwardly through the air flow regulator due to the air flow regulator valve having moved to block air flow upwardly through the air flow regulator, in contrast to the air flowing upwardly through the air flow regulator as shown in FIG. 8.
Figure 11:
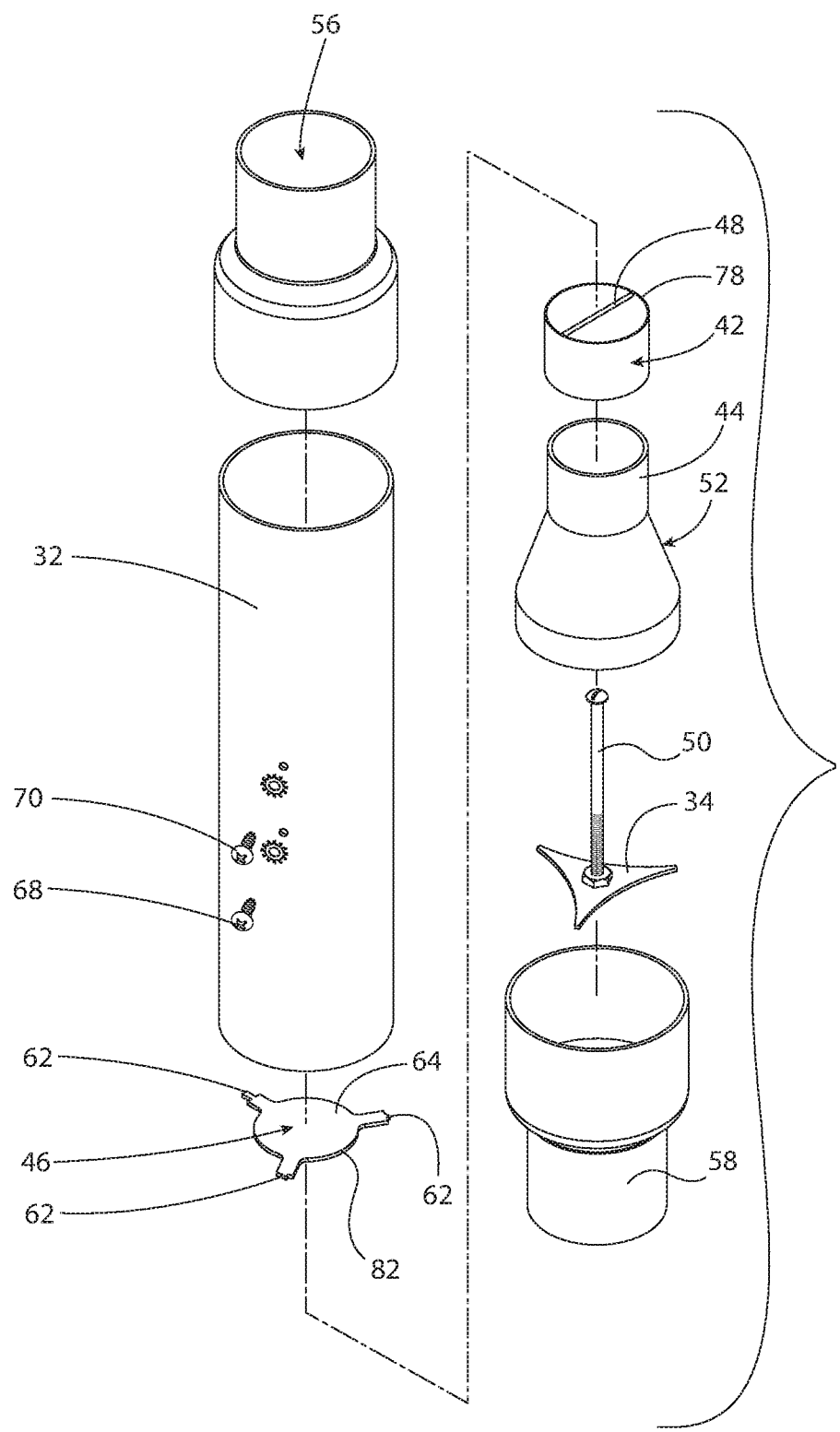
FIG. 11 is an exploded isometric view of the air flow regulator illustrated in FIGS. 5 through 10.
Figure 12:
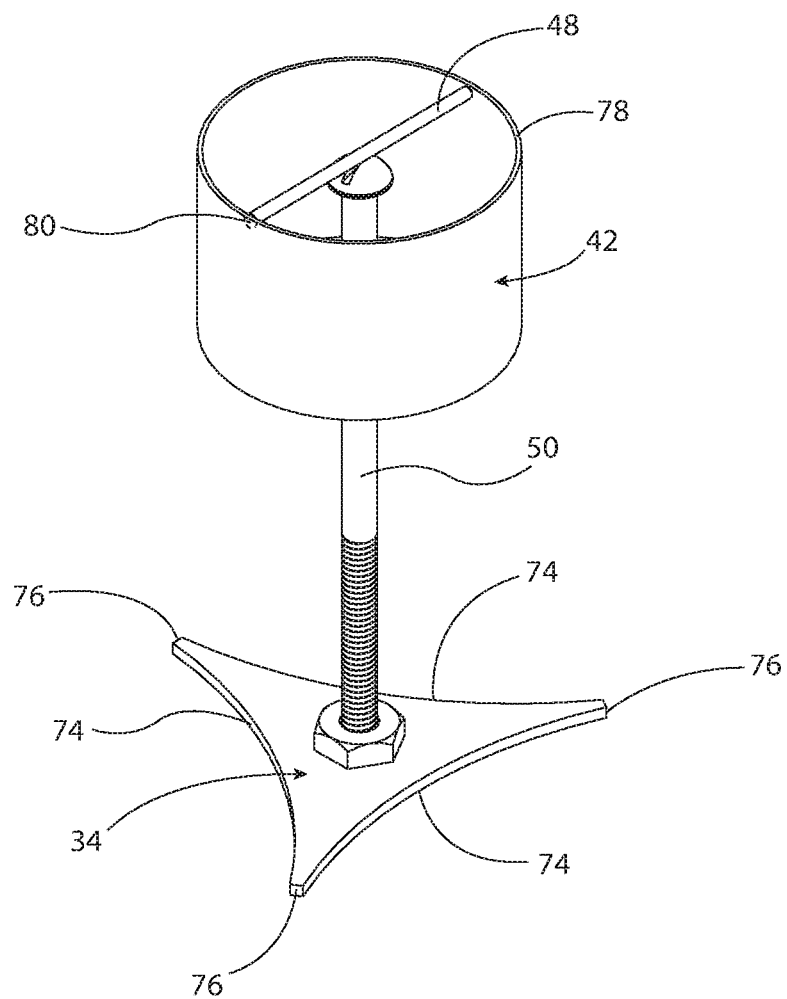
FIG. 12 is an isometric view of the movable portion of the air flow regulator illustrated in FIGS. 5 through 11.

The upper portion of baffle 52, defining fixed internal tubular segment 44, is adapted for sliding telescopic engagement with, and for movement therealong, by movable tubular segment 42. Movable tubular segment 42 moves telescopically along the exterior of fixed interior tubular segment 44. Fixed to movable tubular segment 42 is a first strut 48 preferably extending transversally across the upper portion of movable tubular segment 42 and preferably secured on either end to movable tubular segment 42, as illustrated in FIG. 12. Preferably extending downwardly from first strut 48 is a second strut 50, preferably secured to first strut 48 and preferably also to a sail 34, as illustrated in FIGS. 7 through 12.

Movable sail 34 is preferably planar and positioned fixedly on second strut 50 to remain perpendicular with respect to the axis of vertically oriented outer tube 32. Movable sail 34 is preferably of generally triangular configuration, as best illustrated in FIGS. 11 and 12, with the sides of the triangle curving slightly inwardly. The curved edges 72 of movable sail 34 converge and terminate to form small rectangularly shaped extremities of sail 34, which are designated 76 in FIG. 11. "Rectangular" denotes the shape of the radially outwardly facing surfaces 76 of the extremities of triangularly shaped sail 34, as best illustrated in FIG. 12.

Movable sail 34 is positioned within generally vertically oriented outer tube 32 so that rectangular extremity surfaces 76 are closely adjacent to but do not contact the inner surface of vertically oriented outer tube 32, so long as sail 34 moves vertically up and down within vertically oriented external tube 32. The rectangular shape of extremities 76 with their outwardly facing planar surface assures minimal friction and consequent minimal resistance to movement of movable sail 34 in the event one of rectangular extremities 76 contacts the interior surface of vertically oriented tube 32, should sail 34 for some reason move laterally or otherwise and become skew to the vertical axis of tube 32.

Movable internal tubular segment 42 is telescopically movable, unitarily with sail 34, relative to and along the exterior of fixed internal tubular segment 44. A lower limit of movement of movable tubular segment 42 is illustrated in FIG. 9, where the first strut portion 48 of movable tubular segment 42 (shown in FIG. 12) rests on the upper circular edge of fixed internal tubular segment 44. This is the condition when no air is flowing or drawn through the air flow regulator and gravity causes sail 34 together with movable internal tubular segment 42 to drop, with first strut 48 coming to rest on the upper circular edge of fixed tubular segment 44. The regulator 30/112 is ready to receive air at bottom 54 when vacuum is drawn out upper chamber 56, because the upper end of movable internal tubular segment 42 is open, as shown in FIG. 7.

When air is flowing through an air flow regulator 30 or 112, as illustrated generally in FIG. 8, the moving air pushes against movable sail 34, moving it upwardly. Movable internal tubular segment 42 moves upwardly unitarily with sail 34 due to the fixed connection of movable tubular segment 42 and movable sail 34 made via first and second struts 48, 50, as illustrated in FIGS. 7 through 12.

If air flow upwardly through an air flow regulator 30 or 112 reaches an extreme value, above an acceptable level of operation of the portion of the resin delivery system of which air flow regulator 30 or 112 is a part, the excessive force (resulting from the high volume of air flow contacting sail 34) pushes sail 34 upwardly to the point that upper annular edge 78 of movable internal tubular segment 42 contacts plate 46. In this condition, which is illustrated in FIG. 10, no air can pass between the upper annular edge 78 of movable tubular segment 42 and flow limiting horizontal plate 46, and air flow stops.

Once air flow stops through vertically oriented outer tube 32, gravity pulling downwardly on sail 34, connected movable internal tubular segment 42, and first and second struts 48, 50, causes these parts, which may be connected together and fabricated as a single integral assembly such as shown in FIG. 12, to move downwardly thereby again permitting air flow upwardly through air flow regulator 30/112 as depicted generally in FIG. 8. Consequently, an air flow regulator 30 or 112 is self-regulating in that when air flow is too high, the force of air moving or impinging on sail 34 pushes movable internal tubular segment 42 upwardly until upper annular edge 78 of movable tubular segment 42 contacts plate 46 and no air can then escape upwardly between the upper annular edge 78 of movable tubular segment 42 and plate 46. This stops air flow through an air flow regulator 30 or 112 until downward movement of sail 34 together with movable internal tubular segment 42 moves upper annular edge 78 of movable tubular segment 42 away from plate 46, again permitting air to flow through the upper extremity of movable tubular segment 42, with air passing between upper annular edge 78 of movable internal tubular segment 42 and flow limiting horizontal plate 46, and then escaping through upper outlet end 56 of an air flow regulator 30 or 112. All air flow is upwards through a regulator 30/112, which, when of the preferred type shown in FIGS. 5 through 18, must be essentially vertically oriented in order to operate properly.

With the self-regulating characteristic of air flow regulator 30 or 112, the assembly consisting of movable internal tubular segment 42, first and second struts 48, 50, and sail 34 may oscillate somewhat about the position at which air flow, drawn by suction, is at the desired level, as the vacuum pump drawing air through the flow regulator 30 or 112 varies in cubic feet per minute of air drawn.

Desirably, ends of first strut 48, which is depicted as being horizontally disposed in the drawings, are mounted in movable tubular segment 42 in movable fashion such that first strut 48 can move slightly, rotationally, relative to movable internal segment 42. This is to provide a small amount of "play" in the event movable sail 34 and second strut 50, which is vertically oriented and connected to movable sail 34, become skew with respect to the vertical axis of vertically oriented exterior tube 32. Should this occur, the movable characteristic of first strut 48, being slightly rotatable relative to movable internal tubular segment 42, effectively precludes movable internal tubular segment 42 from binding with respect to fixed internal tubular segment 44 and thereby being restricted from what would otherwise be freely telescoping movement of movable internal tubular segment 42 relative to fixed internal tubular segment 44.

Desirably first strut 48 is rotatable relative to movable internal tubular segment 42, to provide maximum freedom of vertical motion of movable internal tubular segment 42 in the event movable sail 34 becomes skew to the axis of vertically oriented exterior tube 32, with consequent frictional force restricting vertical movement of movable sail 34.

Baffle 52 preferably includes two portions, the upper portion preferably being defined by fixed internal tubular segment 44 and a lower portion preferably being defined by conical portion 66 of baffle 52. A lower edge of baffle 52 is circular and is designated 84 in the drawings. Circular edge 84 fits closely against the annular interior wall of vertically oriented exterior tube 32 so that all air passing upwardly through air flow regulator 30, namely through vertically oriented exterior tube 32, is constrained to flow through the interior of baffle 52. The tight fitting of the circular lower edge of baffle 52 against the interior wall of vertically oriented exterior tube 32 forces all air entering flow regulator 30 from the bottom to flow through the interior of baffle 52, flowing upwardly through lower conical portion 66 of baffle 52.

The air then flows further upwardly through the interior of fixed internal tubular segment 44. Thereafter, if movable internal tubular segment 42 is spaced away from flow limiting horizontal plate 46, air flows along the surface of movable internal tubular segment 42, passing the upper annular edge 78 of movable internal tubular segment 42; air then flows around the space between edge 82 of flow limiting horizontal plate 46 and the interior annular wall of vertically oriented exterior tube 32. The air then flows out of an air flow regulator 30 or 112 via open outlet end 56 formed in end cap 60.

Figure 14:
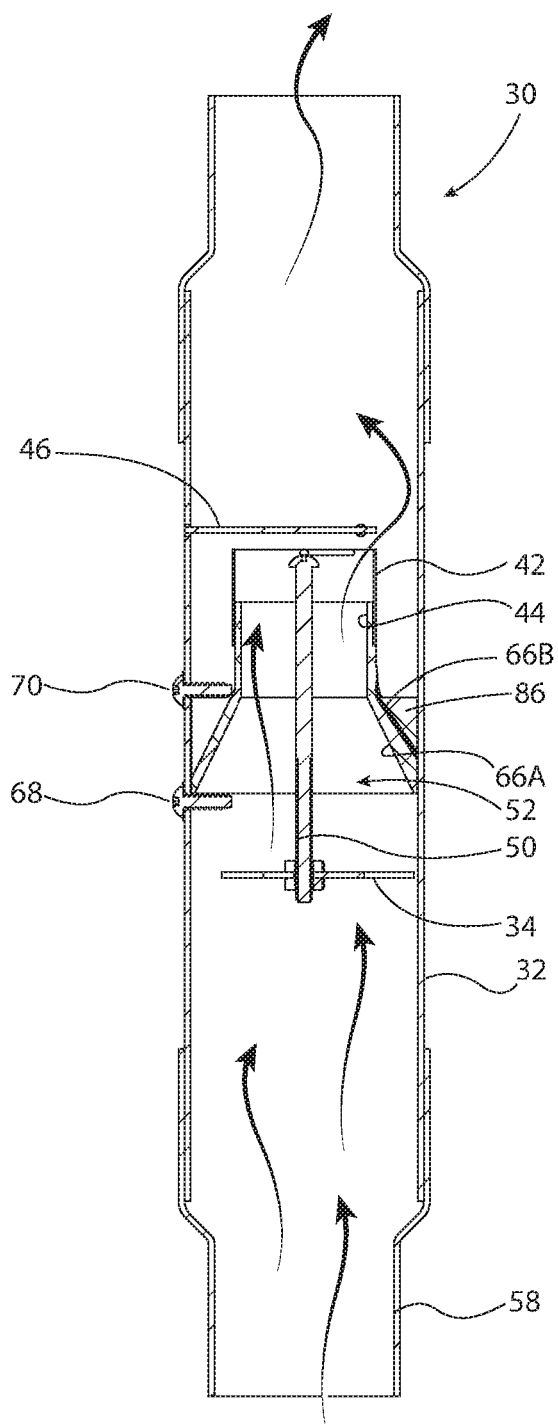
FIG. 14 is sectional view of an air flow regulator similar to FIGS. 5 through 10 and 13, illustrating a second alternate construction of the baffle portion of the air flow regulator.

In an alternate embodiment of an air flow regulator 30 or 112, illustrated in FIG. 14, baffle 52 may be constructed from two very thin pieces that fit closely together, with the two pieces being in essentially facing contact in the area where they define fixed internal tubular segment 44, but diverging one from another in the area where they define conical portion 66 of baffle 52. As illustrated in FIG. 14, the two portions of baffle 52 defining conical portion 66 are designated "66A" and "66B" where they diverge, with baffle inner portion 66A serving to channel air flow upwardly through vertically oriented exterior tube 32 into fixed internal tubular segment portion 44 of baffle 52. The space between the lower parts of baffle portions 66A and 66B is preferably filled with a filler material 86 to provide additional assurance that all air entering vertically oriented exterior tube 32 from the bottom flows through fixed internal tubular segment 44 and on through movable internal tubular segment 42, and does not pass around the edge of baffle 52, namely between baffle 52 and the interior surface of vertically oriented exterior tube 32. Filler material 86 provides additional structural rigidity for flow regulator 30.

Figure 13:
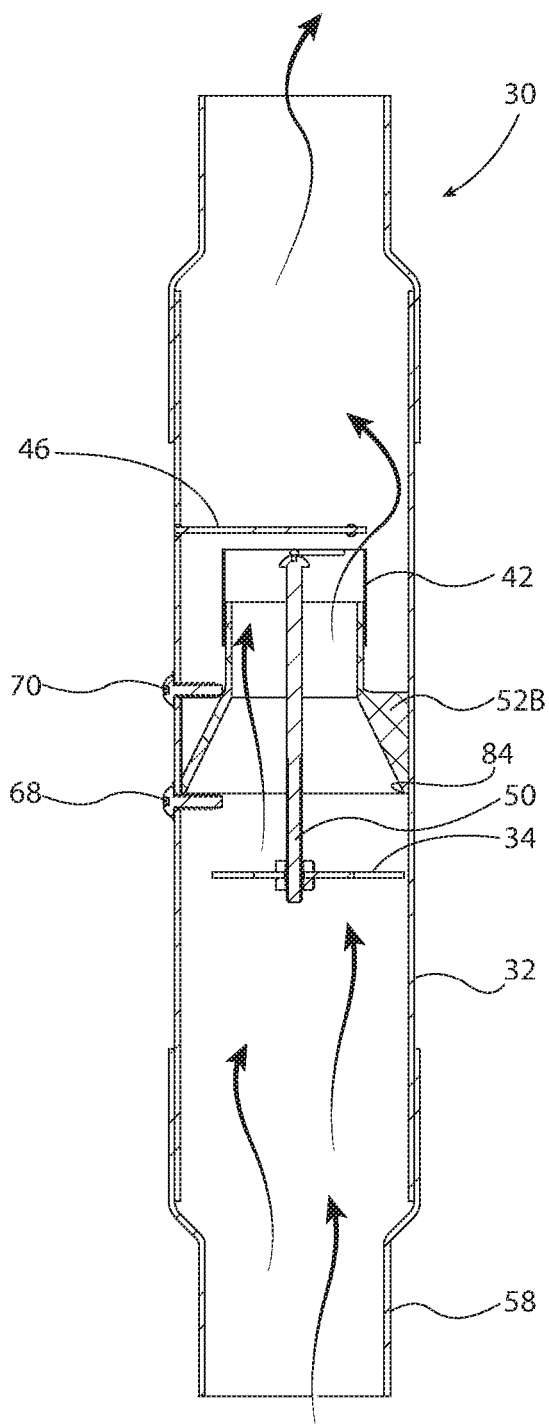
FIG. 13 is a sectional view of an air flow regulator similar to FIGS. 5 through 10, illustrating an alternate construction of the baffle portion of the air flow regulator.

In another alternative environment of the air flow regulator, baffle 52 is one piece, preferably molded plastic, as illustrated in FIG. 13, where baffle 52 is designated 52B to distinguish it from the baffle construction illustrated in FIG. 14 and the baffle construction illustrated in the other drawing figures. In the baffle construction illustrated in FIG. 13, the one piece construction means that there is no need or space for any filler material. The baffle construction illustrated in FIGS. 5 through 10 is preferred.

The assembly illustrated in FIG. 12 comprising the moveable internal tubular segment 42, first strut 48, second strut 50 and moveable sail 34 may preferably be constructed as a single piece or several pieces as required. The assembly of moveable internal segment 42, first and second struts, 48, 50 and moveable sail 34 is referred to herein as a "sail assembly." It is not required that first and second struts 48, 50 be separate pieces; they may preferably be fabricated as a single piece. Additionally, second strut 50, which has been illustrated as a machine screw in FIGS. 11 and 12, need not be a machine screw. Any suitable structure can be used for second strut 50 and it is particularly desirable to fabricate first and second struts 48 and 50 from a single piece of plastic or metal, by molding, or by machining, or by welding, or by otherwise fastening two pieces together. Similarly with the hex nut, which is unnumbered in FIG. 12 and illustrated there, any other suitable means for attachment of the second strut or a vertical portion of a strut assembly to moveable sail 34 may be used.

Figure 15:
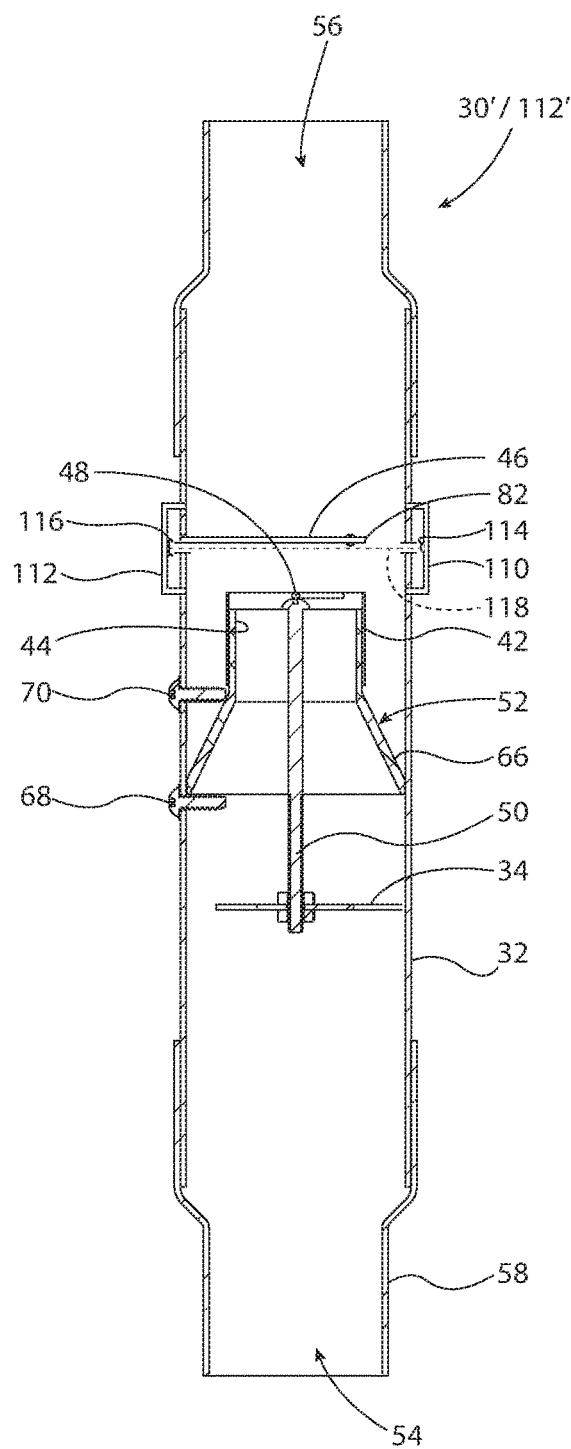
FIG. 15 is a sectional view of an air flow regulator of the type disclosed in U.S. Pat. No. 9,550,635, which is highly similar to the air flow regulators illustrated in FIGS. 5 through 14, with the sectional view being taken in elevation, similarly to FIG. 9, with an electromagnetic beam for detecting position of the movable valve portion of the air flow regulator.
Figure 16:
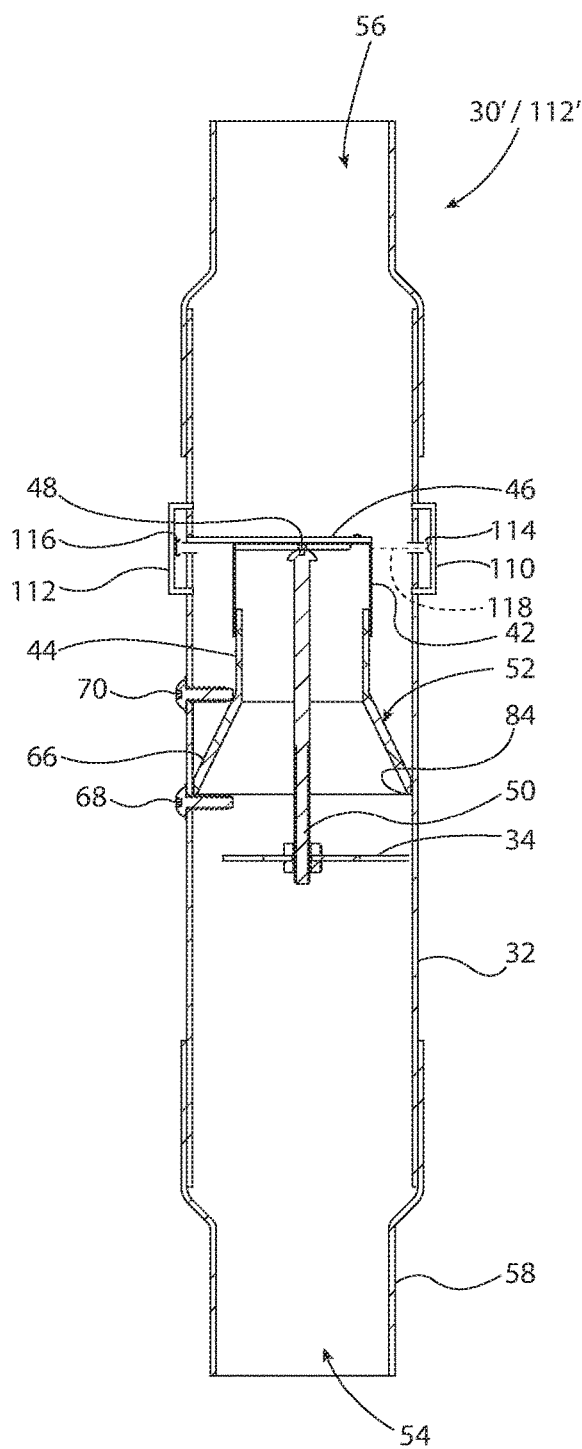
FIG. 16 is a sectional view in elevation, similar to FIG. 15, of the air flow regulator disclosed in FIG. 15 and in U.S. Pat. No. 9,550,635, with the electromagnetic detector beam being blocked by the moveable valve portion of the air flow regulator, thereby indicating that no air is flowing through the air flow regulator.

FIGS. 15 and 16 illustrate air flow regulators 30'/112' having closed/open sensing capability as disclosed in U.S. Pat. No. 9,550,636. The flow regulators illustrated in FIGS. 15 and 16 as 30'/112' are suitable for use as flow regulators 30 and 112 in the instant invention.

Figure 17:
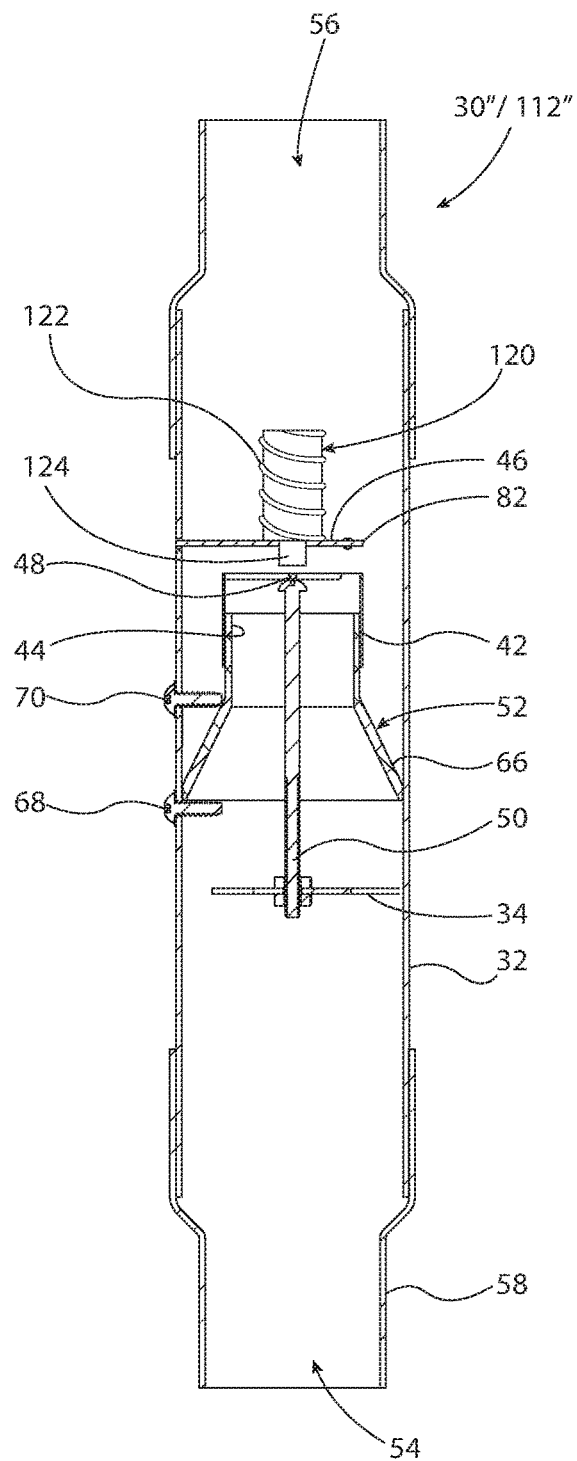
FIG. 17 is a sectional view in elevation, similar to FIG. 9, of an adjustable air flow regulator of the type disclosed in U.S. Pat. No. 9,550,636, which is highly similar to the air flow regulators illustrated in FIGS. 5 through 16, with the air flow regulator internal parts in position whereby a moderate amount of air is entering and flowing through the air flow regulator, the sail assembly has been lifted by the air flow, and the air flow regulator internal valve has not contacted a "stop" defining an intermediate valve position and hence an intermediate maximum air flow rate through the air flow regulator. The air flow regulator is equipped with a solenoid actuated piston, allowing two different geometries and "stop" positions for two different maximum permitted levels of air flow through the regulator. The solenoid actuated piston is in the extended solenoid energized position in FIG. 17.
Figure 18:
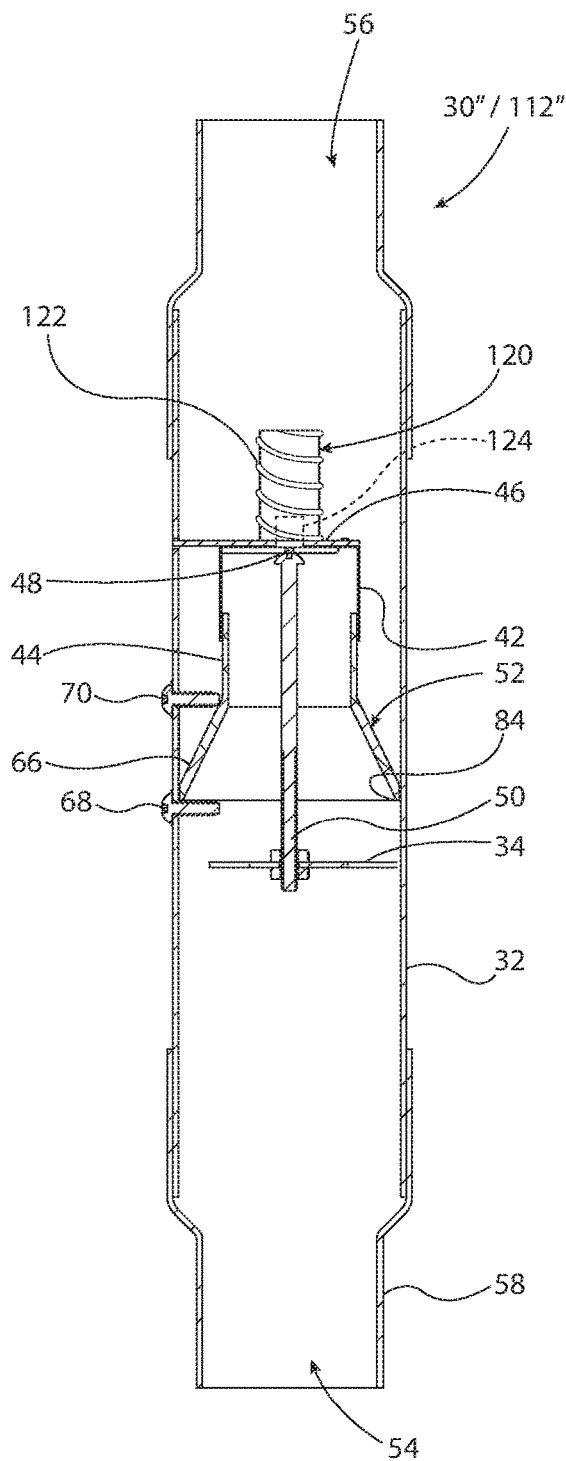
FIG. 18 is a sectional view in elevation of the adjustable air flow regulator illustrated in FIG. 17, with the "stop" provided by the solenoid actuated piston illustrated in FIG. 17 withdrawn and the air flow regulator internal parts in position whereby no air can flow through the air flow regulator due to those internal parts blocking air flow, due to instantaneous air flow exceeding the maximum design value.

FIGS. 17 and 18 illustrate flow regulators 30"/112" that are adjustable. These flow regulators are disclosed in U.S. Pat. No. 9,550,636. These are also suitable for use as flow regulators 30 and 112 in the instant invention.

Air flow regulators 30 and 112 preferably contain no springs. While an electromagnetic sensor is illustrated in FIGS. 15 and 16 and is described above, air flow regulators 30 and 112 require no sensors to provide feedback to a control device; no sensors are needed since because flow regulators 30 and 112 are self-regulating. Each air flow regulator preferably includes a tubular valve, closing against a flat surface, where the tubular valve is defined by movable internal tubular segment 42 closing against flow limiting horizontal plate 46. Movable internal tubular segment 42 is in the form of an open-ended cylinder and is connected to a plate in the form of movable sail 34 to move movable tubular segment 42 against flow limiting horizontal plate 46. The air flow regulator 30/112 uses gravity alone to open the valve defined by the assembly of movable internal tubular segment 42 and movable sail 34 and the connecting structure therebetween.

In the air flow regulator illustrated in FIGS. 5 through 18, the movable internal tubular segment 42 is preferably made with a very thin wall, preferably from metal tubing, where the wall is preferably less than 1/32 inch in thickness.

Air flow regulators 30 and 112 function equally well with a vacuum pump drawing air through air flow regulator from bottom to top by application of vacuum to outlet end 56 as depicted generally in FIGS. 1 through 4, or by air being supplied under positive pressure at inlet end 54 for passage upwardly therethrough.

In the course of practice of the invention with any of the granular plastic resin material conveying systems illustrated, different resin conveying and vacuum line sizes may be used. While 2½ inch and 1½ inch line sizes respectively are suggested and ordinarily used for the primary resin conveying line and for the additive conveying line respectively, these line sizes may be varied. Also, the flow regulators may each be of the same resistance or size, whether located in the primary resin conveyance line or in the secondary conveyance line, with the flow regulator being selected for specific resistance to air flow for the particular line size in which it is located. Moreover, it is within the scope of the invention to use different size flow regulators on the same size primary and/or secondary lines, depending on the particular additive being drawn therethrough (in the case of a secondary line) and depending on the nature and characteristic of the resin being drawn through the primary line.

Although schematic implementations of present invention and at least some of its advantages have been described in detail hereinabove, it should be understood that various changes, substitutions and alterations may be made to the apparatus and methods disclosed herein without departing from the spirit and scope of the invention as defined by the appended claims. Moreover, the scope of this patent application is not intended to be limited to the particular implementations of apparatus and methods described in the specification, nor to any methods that may be described or inferentially understood by those skilled in the art to be present as described in this specification.

As one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention."

The following is claimed:

1. Apparatus for conveying granular plastic resin material from a supply to a receiver that retains and dispenses the resin when needed by a processing machine, comprising:
   a vacuum pump;
   a first air flow regulator connected to a suction head of the vacuum pump;
   a primary conduit connecting the receiver to the air flow regulator and configured to convey only vacuum to the receiver;
   a resin conveying conduit connected to the supply and the receiver and configured to convey the resin from the supply to the receiver in response to the vacuum in the primary conduit;
   at least one auxiliary supply component connected to the receiver for furnishing an auxiliary material thereto;
   a secondary conduit connected to the auxiliary component and the primary conduit so that the secondary conduit and the primary conduit form a flow path the conveys only vacuum to the at least one auxiliary supply component; and
   a second air flow regulator located in the secondary conduit.

2. Apparatus of claim 1 further comprising the second air flow regulator located in a secondary conduit connecting the auxiliary supply component to the primary conduit at a position downstream of the first air flow regulator.

3. Apparatus of claim 1 wherein the primary conduit is of a first diameter; the secondary conduit is of a second diameter, with the first diameter being larger than the second diameter.

4. Apparatus of claim 2 wherein the primary conduit is of a first diameter; the secondary conduit is of a second diameter, with the first diameter being larger than the second diameter.

5. Apparatus of claim 3 wherein the primary conduit is of a first diameter; the secondary conduit is of a second diameter, with the first diameter being larger than the second diameter.

6. Apparatus of claim 5 wherein the first diameter is 2 inches and the second diameter is 1½ inches.

7. Apparatus of claim 6 wherein the primary conduit is of a first diameter; the secondary conduit is of a second diameter, with the first diameter being larger than the second diameter.

8. Apparatus of claim 7 wherein the primary conduit is of a first diameter; the secondary conduit is of a second diameter, with the first diameter being larger than the second diameter.

9. Apparatus of claim 1 wherein each of the air flow regulators comprise:
   a) a vertically oriented tube;
   b) a pair of open-ended telescoping tubular internal segments within the tube, an outer tubular segment being fixed and the other being slide ably movable along the fixed segment in the axial direction;
   c) a plate extending partially across the interior of the vertically oriented tube, positioned for contacting the movable one of the telescoping tubular segments and limiting travel of the moveable telescoping tubular segment, the plate covering an open upper end of the movable telescoping tubular segment upon contact therewith;
   d) a sail positioned in the vertically oriented tube below the telescoping segments;
   e) a strut connecting the sail and the moveable telescoping tubular segment;

f) the baffle positioned to direct upward air flow within the tube into the telescoping tubular segments;

the movable telescoping tubular segment moving vertically within the tube unitarily with the sail responsive to air flow upwardly through the tube against the sail.

10. Apparatus of claim 1 wherein the air flow regulators are tubular.

11. Apparatus for conveying granular plastic resin material from a supply to a receiver that retains and dispenses the resin when needed by a processing machine, consisting of:

a vacuum pump;

a first air flow regulator connected to a suction head of the vacuum pump;

a primary conduit connecting the receiver to the air flow regulator and configured to convey only vacuum to the receiver;

a resin conveying conduit connected to the supply and the receiver and configured to convey the resin from the supply to the receiver in response to the vacuum in the primary conduit;

at least one auxiliary supply component connected to the receiver for furnishing an auxiliary material thereto;

a secondary conduit connected to the auxiliary component and the primary conduit so that the secondary conduit and the primary conduit form a flow path the conveys only vacuum to the at least one auxiliary supply component; and a second air flow regulator located in the secondary conduit.

* * * * *